US012774244B2

(12) United States Patent
Hijiya et al.

(10) Patent No.: US 12,774,244 B2
(45) Date of Patent: Oct. 27, 2026

(54) GLASS, CHEMICALLY STRENGTHENED GLASS, AND COVER GLASS

(71) Applicant: AGC Inc., Tokyo (JP)

(72) Inventors: Hiroyuki Hijiya, Tokyo (JP); Takato Kajihara, Tokyo (JP); Eriko Maeda, Tokyo (JP); Shusaku Akiba, Tokyo (JP); Chieko Suzuki, Tokyo (JP); Kenji Imakita, Tokyo (JP)

(73) Assignee: AGC Inc., Tokyo (JP)

( * ) Notice: Subject to any disclaimer, the term of this patent is extended or adjusted under 35 U.S.C. 154(b) by 278 days.

(21) Appl. No.: 18/792,612

(22) Filed: Aug. 2, 2024

(65) Prior Publication Data

US 2024/0391826 A1 Nov. 28, 2024

Related U.S. Application Data

(63) Continuation of application No. PCT/JP2023/002730, filed on Jan. 27, 2023.

(30) Foreign Application Priority Data

Feb. 2, 2022 (JP) ................................ 2022-015032
Nov. 9, 2022 (JP) ................................ 2022-179855

(51) Int. Cl.
*B32B 15/04* (2006.01)
*B32B 17/06* (2006.01)
(Continued)

(52) U.S. Cl.
CPC ............ *C03C 21/002* (2013.01); *C03C 3/087* (2013.01)

(58) Field of Classification Search
CPC .................................................... C03C 21/002
(Continued)

(56) References Cited

U.S. PATENT DOCUMENTS 11,964,908 B2 * 4/2024 Yuki .................... C03C 21/002
2005/0090377 A1 * 4/2005 Shelestak .................. C03C 3/11 501/69

(Continued)

FOREIGN PATENT DOCUMENTS

JP 2007-527354 A 9/2007
JP 2013-516387 A 5/2013

(Continued)

OTHER PUBLICATIONS

International Search Report issued Mar. 20, 2023 in PCT/JP2023/002730 filed Jan. 27, 2023, citing documents 4-8 and 17-18 therein, 4 pages.

*Primary Examiner* — Lauren R Colgan
(74) *Attorney, Agent, or Firm* — Oblon, McClelland, Maier & Neustadt, L.L.P.

(57) ABSTRACT

A chemically strengthened glass in which a base glass composition of the chemically strengthened glass includes, in terms of molar percentage based on oxides: 55% to 75% of $SiO_2$; 8% to 20% of $Al_2O_3$; 3% to 15% of $Li_2O$; 1% to 5% of $Na_2O$; 0% to 3% of $K_2O$; 0% to 10% of MgO; 0% to 3% of $Y_2O_3$; 0% to 3% of $ZrO_2$; 0% to 10% of CaO; 0% to 5% of SrO; 0% to 5% of ZnO; 0% to 3% of $TiO_2$; 0% to 1% of $SnO_2$; 0% to 5% of $P_2O_5$; and 0% to 10% of $B_2O_3$, a ratio $[ZrO_2]/([Y_2O_3]+[ZrO_2])$ is 0 or more and 0.7 or less, and the total content of $Y_2O_3$ and $ZrO_2$ is 0.0% or more and 3.0% or less, and a value of 1nW represented by the Formula (1) is 10 or more and 20 or less.

7 Claims, 3 Drawing Sheets

(51) Int. Cl.
*C03C 3/087* (2006.01)
*C03C 21/00* (2006.01)

(58) Field of Classification Search
USPC .................................................. 428/410, 426
See application file for complete search history.

(56) References Cited

U.S. PATENT DOCUMENTS

| | | | | |
|---|---|---|---|---|
| 2005/0096210 | A1* | 5/2005 | Kawai | C03C 3/083 |
| 2009/0263662 | A1 | 10/2009 | Shelestak et al. | |
| 2010/0233407 | A1 | 9/2010 | Shelestak et al. | |
| 2011/0079048 | A1 | 4/2011 | Shelestak et al. | |
| 2011/0165393 | A1 | 7/2011 | Bayne et al. | |
| 2012/0321898 | A1* | 12/2012 | Meinhardt | C03C 21/002 428/410 |
| 2013/0189486 | A1 | 7/2013 | Wang et al. | |
| 2015/0052949 | A1 | 2/2015 | Bayne et al. | |
| 2015/0329406 | A1* | 11/2015 | Kawamoto | A61J 1/00 428/34.1 |
| 2019/0161390 | A1* | 5/2019 | Gross | C03C 21/002 |
| 2021/0009462 | A1* | 1/2021 | Murayama | C03C 23/0075 |
| 2021/0155529 | A1* | 5/2021 | Finkeldey | C03C 21/002 |
| 2022/0041493 | A1* | 2/2022 | Yuki | C03C 21/002 |

FOREIGN PATENT DOCUMENTS

| | | | |
|---|---|---|---|
| JP | 2013-520385 | A | 6/2013 |
| WO | WO 2005/043512 | A1 | 5/2005 |

* cited by examiner

GLASS, CHEMICALLY STRENGTHENED GLASS, AND COVER GLASS

TECHNICAL FIELD

The present invention relates to a glass, a chemically strengthened glass, and a cover glass.

BACKGROUND ART

In recent years, a cover glass has been used for the purpose of protecting a display device such as a mobile phone, a smartphone, or a tablet terminal and improving an appearance thereof. The cover glass used in these applications is required to have excellent strength in order to prevent damages due to impacts and the like.

It has been known that the surface strength of a glass can be increased by subjecting the glass to a chemical strengthening treatment by immersion in a potassium nitrate molten salt or the like. For example, Patent Literature 1 discloses that the surface strength of a glass sheet is increased by subjecting a glass to a chemical strengthening treatment by immersion in a potassium nitrate molten salt.

In addition, the strength of the glass can be further increased by chemically strengthening a glass whose composition is adjusted to a specific range. Examples of a component that can increase the strength by increasing the content in the glass composition include $Al_2O_3$ and $Li_2O$. For example, Patent Literature 2 discloses a lithium aluminosilicate glass having a glass transition point of 550° C. or lower and capable of three-dimensional molding and chemical strengthening.

CITATION LIST

Patent Literature

Patent Literature 1: JP2013-516387A
Patent Literature 2: JP2013-520385A

SUMMARY OF INVENTION

Technical Problem

As described above, the strength of the glass can be increased by increasing the content of $Al_2O_3$ and $Li_2O$ in the glass composition. However, a glass containing a large amount of $Al_2O_3$ and $Li_2O$ has problems regarding a devitrification temperature, a crystal growth rate, and a crystallization starting temperature, as shown in the following 1) to 3).

1) The devitrification temperature rises and devitrification is likely to occur. Accordingly, for example, in the case of molding a glass by a float method, crystals are likely to form before a molten glass is poured into a float bath, and the crystals are likely to erode bricks that constitute the float bath.

2) The crystal growth rate increases. Accordingly, for example, in the case of molding a glass by a float method, defects due to crystallization are likely to occur in the float bath.

3) The crystallization starting temperature when raising the temperature of the glass from a low temperature to a high temperature decreases. Accordingly, for example, in molding including a three-dimensional shape (for example, 2.5D or 3D molding) in which a glass is molded into a sheet and then subjected to a heat treatment, when the temperature is raised from room temperature to the molding temperature, it passes through the nucleation temperature, which tends to cause defects due to crystallization.

Therefore, an object of the present invention is to provide a lithium aluminosilicate glass having excellent production properties and strength.

Solution to Problem

The inventors of the present invention have studied the lithium aluminosilicate glass. As a result, it has been found that although $ZrO_2$ is known as a nucleating agent, by co-adding $ZrO_2$ with $Y_2O_3$, the devitrification temperature, the crystal growth rate, and the crystallization starting temperature can be controlled. Further, it has been found that when the ratio of $ZrO_2$ to the total content of $ZrO_2$ and $Y_2O_3$ is set in a specific range, the above physical properties can be controlled to improve the production properties. Thus, the present invention has been completed based on such findings.

1. A glass including, in terms of molar percentage based on oxides:

60% to 70% of $SiO_2$;
10% to 15% of $Al_2O_3$;
8% to 14% of $Li_2O$;
1% to 7% of $Na_2O$;
0% to 5% of $K_2O$;
0% to 5% of $Y_2O_3$; and
0% to 5% of $ZrO_2$, in which
a total content of MgO and CaO is 0.1% to 7%,
a ratio of a content of $ZrO_2$ to a total content of $ZrO_2$ and $Y_2O_3$ is 0.30 or more and 0.70 or less, and
a value of lnW represented by the following Formula (1) is 10 or more and 20 or less, $$\ln W=\ln(([Li_2O]+[Na_2O]+[K_2O]+[MgO]+[CaO]+[SrO]+[BaO]+[ZnO])!/([Li_2O]!\times[Na_2O]!\times[K_2O]!\times[MgO]!\times[CaO]!\times[SrO]!\times[BaO]!\times[ZnO]!)) \quad \text{Formula (1)}$$

provided that, in the Formula (1), $[Li_2O]$, $[Na_2O]$, $[K_2O]$, [MgO], [CaO], [SrO], [BaO], and [ZnO] respectively represent contents of components of $Li_2O$, $Na_2O$, $K_2O$, MgO, CaO, SrO, BaO, and ZnO in terms of molar percentage based on oxides.

2. The glass according to the above 1, having a devitrification temperature of 1300° C. or lower.

3. The glass according to the above 1 or 2, having a crystallization starting temperature Tcs of 790° C. or higher as measured by DSC.

4. The glass according to any one of the above 1 to 3, in which a value (Tcs-Tg) obtained by subtracting a glass transition point Tg from the crystallization starting temperature Tcs is 200° C. or more.

5. A glass including, in terms of molar percentage based on oxides:

60% to 70% of $SiO_2$;
10% to 15% of $Al_2O_3$;
8% to 14% of $Li_2O$;
1% to 7% of $Na_2O$;
0% to 5% of $K_2O$;
0% to 5% of $Y_2O_3$; and
0% to 5% of $ZrO_2$, in which
a total content of MgO and CaO is 0.1% to 7%,
a ratio of a content of $ZrO_2$ to a total content of $ZrO_2$ and $Y_2O_3$ is 0.30 or more and 0.70 or less,
a devitrification temperature is 1300° C. or lower, a crystallization starting temperature Tcs is 790° C. or higher as measured by DSC, a value (Tcs-Tg) obtained by subtracting a glass transition point Tg from the crystallization starting temperature Tcs is 200° C. or more, and a value of 1 nW represented by the following Formula (1) is 10 or more and 20 or less, $$\ln W=\ln(([Li_2O]+[Na_2O]+[K_2O]+[MgO]+[CaO]+[SrO]+[BaO]+[ZnO])!/([Li_2O]!\times[Na_2O]!\times[K_2O]!\times[MgO]!\times[CaO]!\times[SrO]!\times[BaO]!\times[ZnO]!)) \quad \text{Formula (1)}$$

provided that, in the Formula (1), $[Li_2O]$, $[Na_2O]$, $[K_2O]$, [MgO], [CaO], [SrO], [BaO], and [ZnO] respectively represent contents of components of $Li_2O$, $Na_2O$, $K_2O$, MgO, CaO, SrO, BaO, and ZnO in terms of molar percentage based on oxides.

6. The glass according to any one of the above 1 to 5, in which the total content of $ZrO_2$ and $Y_2O_3$ is 5% or less in terms of molar percentage based on oxides.

7. The glass according to any one of the above 1 to 6, in which a total content of $Li_2O$, $Na_2O$, and $K_2O$ is 18% or less in terms of molar percentage based on oxides.

8. The glass according to any one of the above 1 to 7, which has a devitrification temperature of 1250° C. or lower.

9. The glass according to any one of the above 1 to 8, in which a ratio (Tcs+273.15)/(Tg+273.15) of the crystallization starting temperature Tcs to the glass transition point Tg is 1.10 or more.

10. The glass according to any one of the above 1 to 9, having a crystal growth rate of a β-quartz solid solution at 1000° C. of 600 μm/hr or less.

11. The glass according to any one of the above 1 to 10, having a fracture toughness value K1c of 0.800 $MPa\cdot m^{1/2}$ or more.

12. The glass according to any one of the above 1 to 11, in which Na_DOL/K_DOL, which is a ratio of Na_DOL to K_DOL defined below, is 26 or less, K_DOL: a compressive stress layer depth of a chemically strengthened glass obtained by subjecting the glass to ion exchange using a molten salt made of 100% potassium nitrate, Na_DOL: a compressive stress layer depth of a chemically strengthened glass obtained by subjecting the glass to ion exchange using a molten salt made of 100% sodium nitrate, provided that a time and a temperature of the ion exchange in calculating the K_DOL and the Na_DOL are same conditions.

13. A chemically strengthened glass including a compressive stress layer on a surface layer thereof, in which a base glass composition of the chemically strengthened glass includes, in terms of molar percentage based on oxides:

60% to 70% of $SiO_2$;

10% to 15% of $Al_2O_3$;

8% to 14% of $Li_2O$;

1% to 7% of $Na_2O$;

0% to 5% of $K_2O$; and

0% to 5% of $Y_2O_3$; and

0% to 5% of $ZrO_2$, a total content of MgO and CaO is 0.1% to 7%, a ratio of a content of $ZrO_2$ to a total content of $ZrO_2$ and $Y_2O_3$ is 0.30 or more and 0.70 or less, and a value of lnW represented by the following Formula (1) is 10 or more and 20 or less, $$\ln W=\ln(([Li_2O]+[Na_2O]+[K_2O]+[MgO]+[CaO]+[SrO]+[BaO]+[ZnO])!/([Li_2O]!\times[Na_2O]!\times[K_2O]!\times[MgO]!\times[CaO]!\times[SrO]!\times[BaO]!\times[ZnO]!)) \quad \text{Formula (1)}$$

provided that, in the Formula (1), $[Li_2O]$, $[Na_2O]$, $[K_2O]$, [MgO], [CaO], [SrO], [BaO], and [ZnO] respectively represent contents of components of $Li_2O$, $Na_2O$, $K_2O$, MgO, CaO, SrO, BaO, and ZnO in terms of molar percentage based on oxides.

14. The chemically strengthened glass according to the above 13, in which the total content of $ZrO_2$ and $Y_2O_3$ is 5% or less in terms of molar percentage based on oxides.

15. The chemically strengthened glass according to the above 13 or 14, in which a total content of $Li_2O$, $Na_2O$, and $K_2O$ is 18% or less in terms of molar percentage based on oxides.

16. A glass including, in terms of molar percentage based on oxides:

60% to 70% of $SiO_2$;

10% to 15% of $Al_2O_3$;

8% to 14% of $Li_2O$;

1% to 7% of $Na_2O$;

0% to 5% of $K_2O$;

0% to 5% of $Y_2O_3$;

0% to 5% of $ZrO_2$; and more than 0.9% and 7% or less of MgO, in which a total content of MgO and CaO is more than 0.9% and 7% or less, a ratio of a content of $ZrO_2$ to a total content of $ZrO_2$ and $Y_2O_3$ is 0.20 or more and 0.70 or less, and a value of 1 nW represented by the following Formula (1) is 10 or more and 20 or less, $$\ln W=\ln(([Li_2O]+[Na_2O]+[K_2O]+[MgO]+[CaO]+[SrO]+[BaO]+[ZnO])!/([Li_2O]!\times[Na_2O]!\times[K_2O]!\times[MgO]!\times[CaO]!\times[SrO]!\times[BaO]!\times[ZnO]!)) \quad \text{Formula (1)}$$

provided that, in the Formula (1), $[Li_2O]$, $[Na_2O]$, $[K_2O]$, [MgO], [CaO], [SrO], [BaO], and [ZnO] respectively represent contents of components of $Li_2O$, $Na_2O$, $K_2O$, MgO, CaO, SrO, BaO, and ZnO in terms of molar percentage based on oxides.

17. The glass according to the above 16, having a devitrification temperature of 1300° C. or lower.

18. The glass according to the above 16 or 17, having a crystallization starting temperature Tcs of 790° C. or higher as measured by DSC.

19. The glass according to any one of the above 16 to 18, in which a value (Tcs-Tg) obtained by subtracting a glass transition point Tg from the crystallization starting temperature Tcs is 180° C. or more.

20. A glass including, in terms of molar percentage based on oxides:

60% to 70% of $SiO_2$;

10% to 15% of $Al_2O_3$;

8% to 14% of $Li_2O$;

1% to 7% of $Na_2O$;

0% to 5% of $K_2O$;

0% to 5% of $Y_2O_3$;

0% to 5% of $ZrO_2$; and more than 0.9% and 7% or less of MgO, in which a total content of MgO and CaO is more than 0.9% and 7% or less, a ratio of a content of $ZrO_2$ to a total content of $ZrO_2$ and $Y_2O_3$ is 0.20 or more and 0.70 or less, a devitrification temperature is 1300° C. or lower, a crystallization starting temperature Tcs is 790° C. or higher as measured by DSC, a value (Tcs-Tg) obtained by subtracting a glass transition point Tg from the crystallization starting temperature Tcs is 180° C. or more, and a value of 1 nW represented by the following Formula (1) is 10 or more and 20 or less, $$\ln W=\ln(([Li_2O]+[Na_2O]+[K_2O]+[MgO]+[CaO]+[SrO]+[BaO]+[ZnO])!/([Li_2O]!\times[Na_2O]!\times[K_2O]!\times[MgO]!\times[CaO]!\times[SrO]!\times[BaO]!\times[ZnO]!)) \quad \text{Formula (1)}$$

provided that, in the Formula (1), $[Li_2O]$, $[Na_2O]$, $[K_2O]$, [MgO], [CaO], [SrO], [BaO], and [ZnO] respectively represent contents of components of $Li_2O$, $Na_2O$, $K_2O$, MgO, CaO, SrO, BaO, and ZnO in terms of molar percentage based on oxides.

21. The glass according to any one of the above 16 to 20, having a devitrification temperature of 1250° C. or lower.

22. The glass according to any one of the above 16 to 21, in which the total content of $ZrO_2$ and $Y_2O_3$ is 5% or less in terms of molar percentage based on oxides.

23. The glass according to any one of the above 16 to 22, in which a total content of $Li_2O$, $Na_2O$, and $K_2O$ is 18% or less in terms of molar percentage based on oxides.

24. The glass according to any one of the above 16 to 23, in which a content of $K_2O$ is 0.1% or more and 5% or less in terms of molar percentage based on oxides.

25. The glass according to any one of the above 16 to 24, in which the content of $K_2O$ is 0.5% or more and less than 3% in terms of molar percentage based on oxides.

26. The glass according to any one of the above 16 to 25, in which a ratio $(K_2O/(Li_2O+Na_2O+K_2O))$ of the content of $K_2O$ to the total content of $Li_2O$, $Na_2O$, and $K_2O$ is 0.05 or more and 0.20 or less in terms of molar percentage based on oxides.

27. The glass according to any one of the above 16 to 26, in which a content of $Y_2O_3$ is more than 0% and 2% or less in terms of molar percentage based on oxides.

28. The glass according to any one of the above 16 to 27, in which the value of 1 nW is 13 or more and 18 or less.

29. The glass according to any one of the above 16 to 28, having a crystal growth rate of a β-quartz solid solution at 1000° C. of 4000 μm/hr or less.

30. The glass according to any one of the above 16 to 29, in which a ratio (Tcs+273.15)/(Tg+273.15) of the crystallization starting temperature Tcs to the glass transition point Tg is 1.10 or more.

31. The glass according to any one of the above 16 to 30, having a fracture toughness value K1c of 0.820 $MPa\text{-}m^{12}$ or more.

32. The glass according to any one of the above 16 to 31, in which Na_DOL/K_DOL, which is a ratio of Na_DOL to K_DOL defined below, is 26 or less, K_DOL: a compressive stress layer depth of a chemically strengthened glass obtained by subjecting the glass to ion exchange using a molten salt made of 100% potassium nitrate, Na_DOL: a compressive stress layer depth of a chemically strengthened glass obtained by subjecting the glass to ion exchange using a molten salt made of 100% sodium nitrate, provided that, a time and a temperature of the ion exchange in calculating the K_DOL and the Na_DOL are same conditions.

33. A chemically strengthened glass including a compressive stress layer on a surface layer thereof, in which a base glass composition of the chemically strengthened glass includes, in terms of molar percentage based on oxides:

60% to 70% of $SiO_2$;
10% to 15% of $Al_2O_3$;
8% to 14% of $Li_2O$;
1% to 7% of $Na_2O$;
0% to 5% of $K_2O$;
0% to 5% of $Y_2O_3$;
0% to 5% of $ZrO_2$; and
more than 0.9% and 7% or less of MgO, a total content of MgO and CaO is more than 0.9% and 7% or less, a ratio of a content of $ZrO_2$ to a total content of $ZrO_2$ and $Y_2O_3$ is 0.20 or more and 0.70 or less, and a value of lnW represented by the following Formula (1) is 10 or more and 20 or less, $$\ln W=\ln(([Li_2O]+[Na_2O]+[K_2O]+[MgO]+[CaO]+[SrO]+[BaO]+[ZnO])!/([Li_2O]!\times[Na_2O]!\times[K_2O]!\times[MgO]!\times[CaO]!\times[SrO]!\times[BaO]!\times[ZnO]!)) \quad \text{Formula (1)}$$

provided that, in the Formula (1), $[Li_2O]$, $[Na_2O]$, $[K_2O]$, [MgO], [CaO], [SrO], [BaO], and [ZnO] respectively represent contents of components of $Li_2O$, $Na_2O$, $K_2O$, MgO, CaO, SrO, BaO, and ZnO in terms of molar percentage based on oxides.

34. The chemically strengthened glass according to the above 33, in which the total content of $ZrO_2$ and $Y_2O_3$ is 5% or less in terms of molar percentage based on oxides.

35. The chemically strengthened glass according to the above 33 or 34, in which a total content of $Li_2O$, $Na_2O$, and $K_2O$ is 18% or less in terms of molar percentage based on oxides.

36. The chemically strengthened glass according to any one of the above 33 to 35, in which a content of $K_2O$ is 0.1% or more and 5% or less in terms of molar percentage based on oxides.

37. The chemically strengthened glass according to any one of the above 33 to 36, in which the content of $K_2O$ is 0.5% or more and less than 3% in terms of molar percentage based on oxides.

38. The chemically strengthened glass according to any one of the above 33 to 37, in which a ratio $(K_2O/(Li_2O+Na_2O+K_2O))$ of the content of $K_2O$ to the total content of $Li_2O$, $Na_2O$, and $K_2O$ is 0.05 or more and 0.20 or less in terms of molar percentage based on oxides.

39. The chemically strengthened glass according to any one of the above 33 to 38, in which a content of $Y_2O_3$ is more than 0% and 2% or less in terms of molar percentage based on oxides.

40. The chemically strengthened glass according to any one of the above 33 to 39, in which the value of lnW is 13 or more and 18 or less.

41. A cover glass including:

the glass according to any one of the above 1 to 12 and 16 to 32, or the chemically strengthened glass according to any one of the above 13 to 15 and 33 to 40.

42. A chemically strengthened glass including a compressive stress layer on a surface layer thereof, in which a base glass composition of the chemically strengthened glass includes, in terms of molar percentage based on oxides:

55% to 75% of $SiO_2$;
8% to 20% of $Al_2O_3$;
3% to 15% of $Li_2O$;
1% to 5% of $Na_2O$;
0% to 3% of $K_2O$;
0% to 10% of MgO;
0% to 3% of $Y_2O_3$;
0% to 3% of $ZrO_2$;
0% to 10% of CaO;
0% to 5% of SrO;
0% to 5% of ZnO;

0% to 3% of $TiO_2$;
0% to 1% of $SnO_2$;
0% to 5% of $P_2O_5$; and
0% to 10% of $B_2O_3$,
a ratio $[ZrO_2]/([Y_2O_3]+[ZrO_2])$ of a content of $ZrO_2$ to a total content of $[Y_2O_3]$ and $[ZrO_2]$ is 0 or more and 0.7 or less, and
the total content of $Y_2O_3$ and $ZrO_2$ is 0.0% or more and 3.0% or less.

43. A chemically strengthened glass, in which a ratio $[K_2O]/[Na_2O]$ of a content of $K_2O$ to a content of $Na_2O$ is 0 or more and 1.8 or less.

44. A chemically strengthened glass, in which a value represented by $[Al_2O_3]-[Na_2O]-[K_2O]+[Li_2O]$ is 15.0% or more and 26.0% or less.

Advantageous Effects of Invention

When the glass according to the present invention has a glass composition in a specific range and has the ratio of $ZrO_2$ to the total content of $ZrO_2$ and $Y_2O_3$ in a specific range, 1) an increase in devitrification temperature, 2) an increase in crystal growth rate, and 3) a decrease in crystallization starting temperature caused by containing a large amount of $Al_2O_3$ and $Li_2O$ are prevented, and excellent production properties are exhibited.

DESCRIPTION OF EMBODIMENTS

Figure 1:
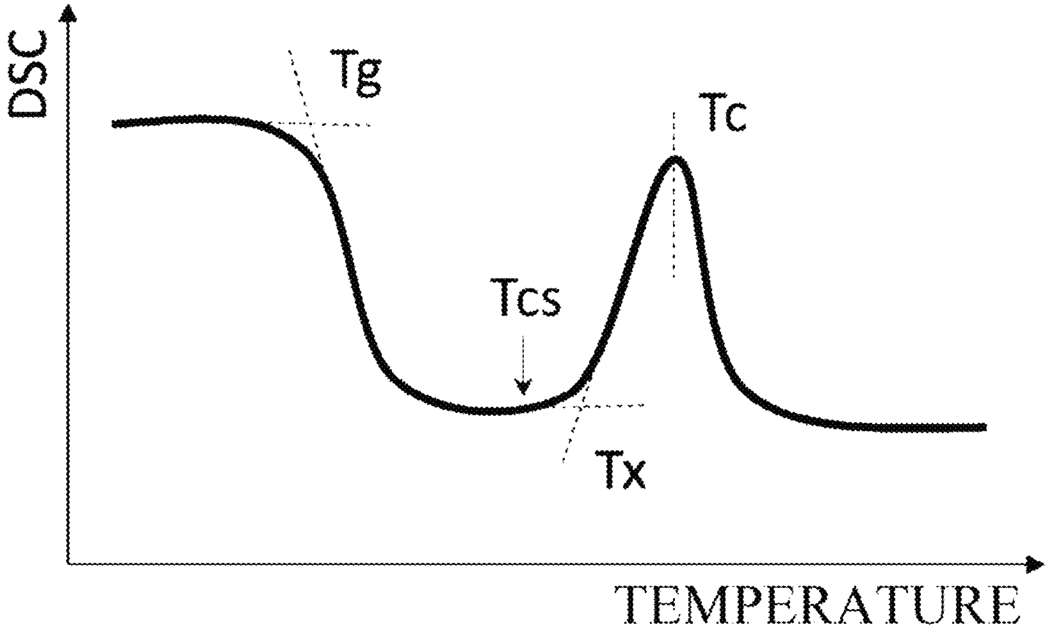
FIG. 1 shows a DSC curve of a glass according to one embodiment of the present invention.

Hereinafter, a glass according to the present invention will be described in detail, but the present invention is not limited to the following embodiment, and can be optionally modified and implemented without departing from the gist of the present invention.

In the present description, the term "chemically strengthened glass" refers to a glass after being subjected to a chemical strengthening treatment. The term "glass for chemical strengthening" refers to a glass before being subjected to a chemical strengthening treatment.

In the present description, a glass composition of the glass for chemical strengthening may be referred to as a base glass composition of the chemically strengthened glass. In the chemically strengthened glass, a compressive stress layer is generally formed on a glass surface portion by ion exchange, and thus, the glass composition of a portion not subjected to ion exchange coincides with the base glass composition of the chemically strengthened glass.

In the present description, the glass composition is expressed in terms of molar percentage based on oxides, and mol % is simply expressed as %. In addition, "to" indicating a numerical range is used to include numerical values written before and after it as a lower limit value and an upper limit value.

In the glass composition, "not substantially contained" means that a component is not contained other than inevitable impurities contained in a raw material or the like, that is, the component is not intentionally contained. Specifically, the content of components other than a coloring component is preferably less than 0.1 mol %, more preferably 0.08 mol % or less, and still more preferably 0.05 mol % or less.

In the present description, a "stress profile" is a pattern representing a compressive stress value with the depth from a glass surface as a variable. A negative compressive stress value means a tensile stress.

In the present description, the "stress profile" can be measured by a method using a combination of an optical waveguide surface stress meter and a scattered light photoelastic stress meter.

The optical waveguide surface stress meter can correctly measure the stress of the glass in a short time. Examples of the optical waveguide surface stress meter include FSM-6000 manufactured by Orihara Industrial Co., Ltd. However, in principle, the optical waveguide surface stress meter can measure the stress only when the refractive index decreases from the surface toward the inside of a sample. In the chemically strengthened glass, a layer obtained by substituting sodium ions inside the glass with external potassium ions has a refractive index that decreases from the surface toward the inside of the sample, and thus the stress can be measured by the optical waveguide surface stress meter. However, a stress of the layer obtained by substituting lithium ions inside the glass with external sodium ions cannot be correctly measured by the optical waveguide surface stress meter.

The stress can be measured by a method using the scattered light photoelastic stress meter, regardless of a refractive index distribution. Examples of the scattered light photoelastic stress meter include SLP 1000 manufactured by Orihara Industrial Co., Ltd. However, the scattered light photoelastic stress meter is likely to be influenced by surface scattering, and may not correctly measure a stress in the vicinity of the surface.

Due to the above reasons, correct stress measurement is possible by combining two types of measuring devices, that is, an optical waveguide surface stress meter and a scattered light photoelastic stress meter.

Figure 2:
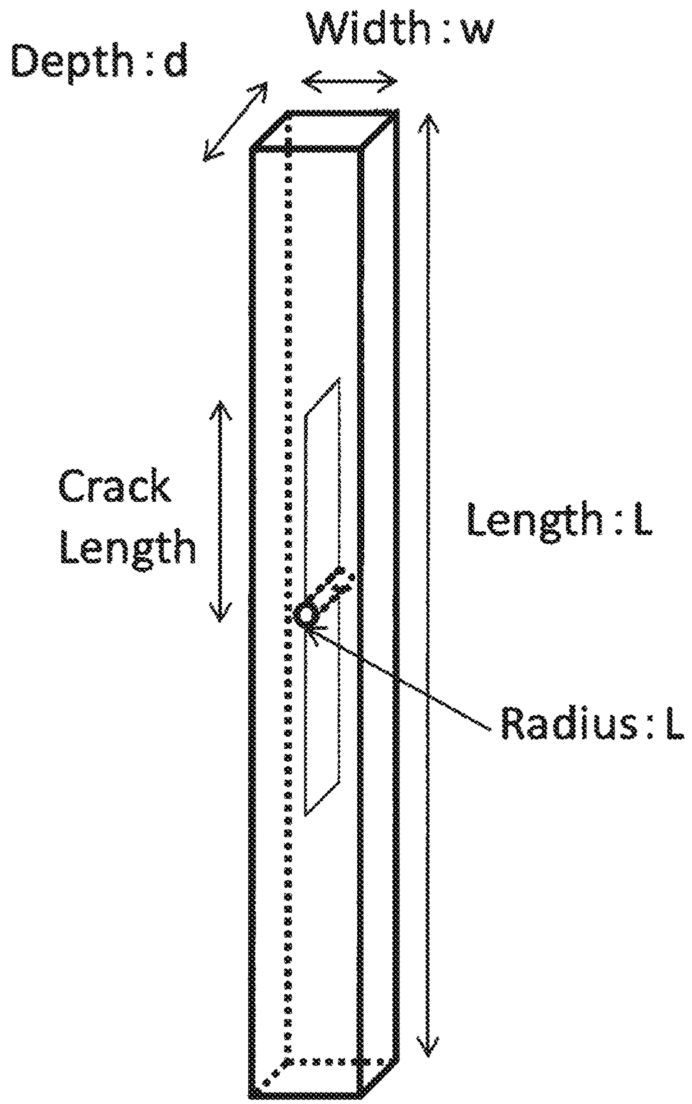
FIG. 2 is a diagram illustrating a sample for use in measuring a fracture toughness value K1c by a DCDC method.
Figure 3:
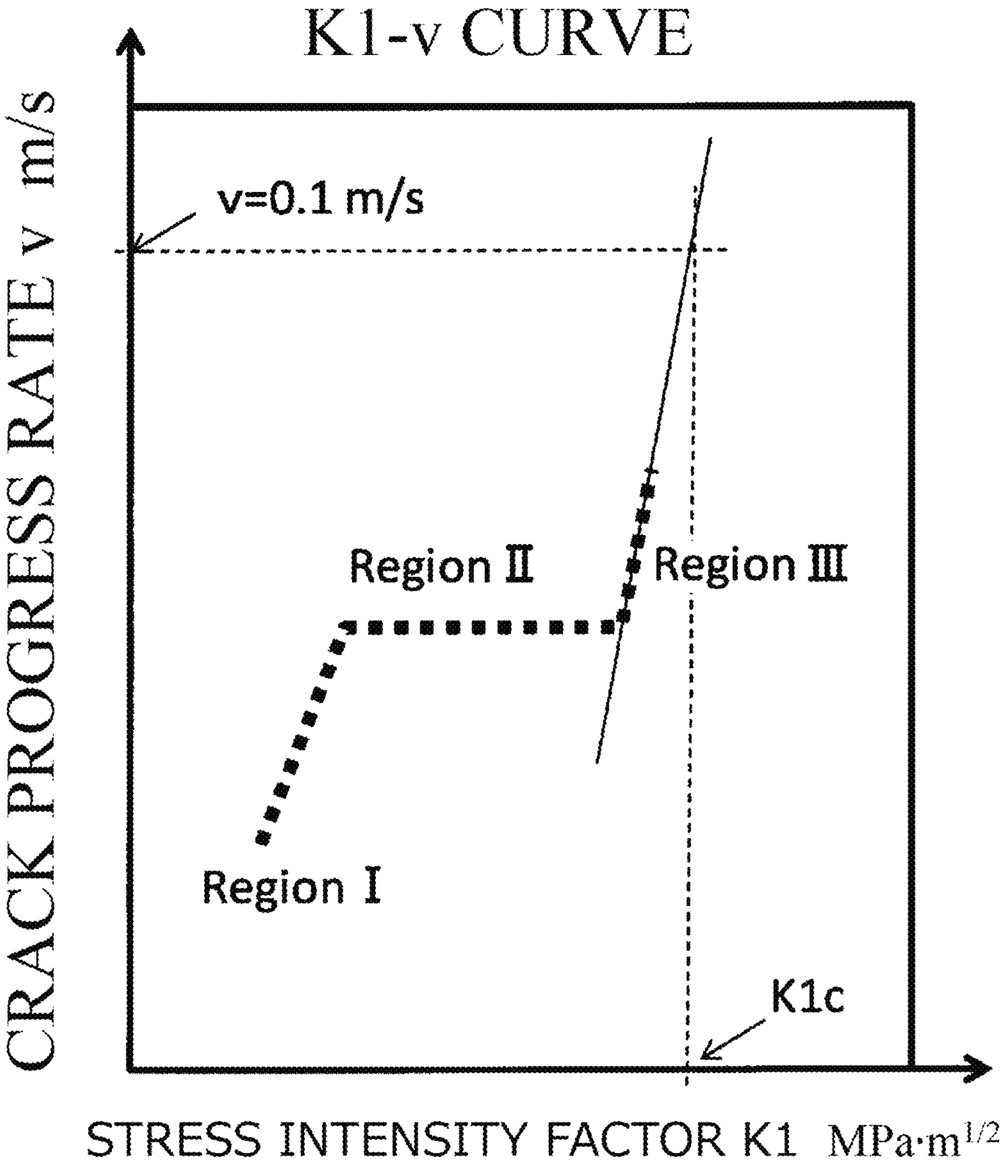
FIG. 3 is a diagram showing a K1-v curve showing a relationship between a stress intensity factor K1 (unit: $MPa \cdot m^{1/2}$) and a crack progress rate v (unit: m/s) for use in measuring the fracture toughness value K1c by the DCDC method.

In the present description, the "fracture toughness value K1c" is measured with reference to the DCDC method [Reference: M. Y. He, M. R. Turner and A. G. Evans, Acta Metall. Mater. 43 (1995) 3453]. Specifically, a sample having a shape shown in FIG. 2 and Autograph AGS-X5KN manufactured by SHIMADZU Corporation are used, a K1-v curve showing a relationship between a stress intensity factor K1 (unit: $MPa \cdot m^{1/2}$) and a crack progress rate v (unit: m/s) as shown in FIG. 3 is measured, the obtained data for a Region III is regressed and extrapolated using a linear equation, and the stress intensity factor K1 at 0.1 m/s is set as the fracture toughness value K1c.

<Glass>

<<Composition>>

A glass according to the present embodiment 1 contains, in terms of molar percentage based on oxides:
60% to 70% of $SiO_2$;
10% to 15% of $Al_2O_3$;
8% to 14% of $LiO_2$;
1% to 7% of $Na_2O$;
0% to 5% of $K_2O$;
0% to 5% of $Y_2O_3$; and
0% to 5% of $ZrO_2$, in which a total content of MgO and CaO is 0.1% to 7%, and a ratio of $ZrO_2$ to a total content of $ZrO_2$ and $Y_2O_3$ is 0.30 or more and 0.70 or less.

In addition, a glass according to the present embodiment 2 contains, in terms of molar percentage based on oxides:

60% to 70% of $SiO_2$;

10% to 15% of $Al_2O_3$;

8% to 14% of $Li_2O$;

1% to 7% of $Na_2O$;

0% to 5% of $K_2O$;

0% to 5% of $Y_2O_3$;

0% to 5% of $ZrO_2$; and more than 0.9% and 7% or less of MgO, in which a total content of MgO and CaO is more than 0.9% and 7% or less, and a ratio of $ZrO_2$ to a total content of $ZrO_2$ and $Y_2O_3$ is 0.20 or more and 0.70 or less.

Hereinafter, the glass composition will be described.

$SiO_2$ is a component that constitutes a glass network. It is also a component that improves the chemical durability and a component that reduces occurrence of cracks when the glass surface is scratched.

The content of $SiO_2$ is preferably 60.0% or more, preferably 62.0% or more, more preferably 64.0% or more, and particularly preferably 66.0% or more, in order to improve the chemical durability. On the other hand, the content of $SiO_2$ is preferably 70.0% or less, more preferably 68.0% or less, still more preferably 67.0% or less, and particularly preferably 66.0% or less, from the viewpoint of improving the meltability.

$Al_2O_3$ is a component that improves the ion exchange performance during chemical strengthening and that increases the surface compressive stress after strengthening.

From the viewpoint of obtaining the above effects, the content of $Al_2O_3$ is preferably 10.0% or more, preferably 11.0% or more, more preferably 11.5% or more, still more preferably 12.0% or more, even more preferably 12.5% or more, and particularly preferably 13.0% or more. On the other hand, when the content of $Al_2O_3$ is too large, crystals are likely to grow during melting, and a decrease in yield due to devitrification defects is likely to occur. In addition, the high temperature viscosity of the glass increases, making it difficult to melt. From such a viewpoint, the content of $Al_2O_3$ is preferably 15.0% or less, preferably 14.0% or less, more preferably 13.5% or less, and still more preferably 13.0% or less.

Both $SiO_2$ and $Al_2O_3$ are components that stabilize the structure of the glass. The total content is preferably 74.0% or more, more preferably 76.0% or more, and still more preferably 78.0% or more, in order to reduce the brittleness.

Both $SiO_2$ and $Al_2O_3$ tend to raise the melting temperature of the glass. Therefore, the total content is preferably 83.0% or less, more preferably 82.0% or less, still more preferably 81.0% or less, and particularly preferably 80.5% or less, in order to facilitate melting.

$Li_2O$ is a component that forms the surface compressive stress by ion exchange, and is a component that improves the meltability of the glass. When the chemically strengthened glass contains $Li_2O$, a stress profile with a large surface compressive stress and a large compressive stress layer is obtained by a method of performing ion exchange of Li ions on the glass surface with external Na ions, and further ion exchange of Na ions with external K ions. The content of $Li_2O$ is preferably 8.0% or more, preferably 9.0% or more, more preferably 9.5% or more, still more preferably 10.0% or more, particularly preferably 10.2% or more, and most preferably 10.4% or more, from the viewpoint of easily obtaining a preferred stress profile.

On the other hand, when the content of $Li_2O$ is too large, the crystal growth rate during glass molding increases, and a decrease in quality due to devitrification is likely to occur. The content of $Li_2O$ is preferably 14.0% or less, and preferably 13.5% or less, 13.0% or less, 12.5% or less, 12.0% or less, 11.5% or less, 11.0% or less, and 10.8% or less in order.

$Na_2O$ and $K_2O$ are components that improves the meltability of the glass and reduces the crystal growth rate during glass molding. It is also preferable to contain $Na_2O$ and $K_2O$ in a small amount in order to improve the ion exchange performance.

$Na_2O$ is a component that forms a surface compressive stress layer in a chemical strengthening treatment using a potassium salt, and is a component that reduces the viscosity of the glass. In order to obtain the effect, the content of $Na_2O$ is preferably 1.0% or more, preferably 1.5% or more, 1.7% or more, 1.9% or more, and 2.2% or more in order, more preferably 2.5% or more, still more preferably 2.8% or more, and particularly preferably 3.0% or more. On the other hand, the content of $Na_2O$ is preferably 7.0% or less, preferably 6.5% or less, more preferably 6.0% or less, still more preferably 5.5% or less, and particularly preferably 5.0% or less, from the viewpoint of avoiding a decrease in surface compressive stress (CS) during a strengthening treatment using a sodium salt.

$K_2O$ is a component that prevents devitrification by preventing a rise in devitrification temperature and that improves the ion exchange performance. In the case where $K_2O$ is contained, the content thereof is preferably 0.1% or more, more preferably 0.15% or more, particularly preferably 0.2% or more, and most preferably 0.5% or more. On the other hand, when the content of $K_2O$ is too large, the brittleness of the glass is likely to decrease, and the efficiency of the chemical strengthening may decrease. From such a viewpoint, the content of $K_2O$ is preferably 5.0% or less, and preferably 4.5% or less, 4.0% or less, 3.5% or less, 3.0% or less, less than 3.0%, 2.5% or less, 2.4% or less, 2.2% or less, 2.0% or less, 1.8% or less, 1.6% or less, 1.4% or less, and 1.2% or less in order.

A ratio ($K_2O/(Li_2O+Na_2O+K_2O)$) of the content of $K_2O$ to a total content of $Li_2O$, $Na_2O$, and $K_2O$ is preferably 0.05 or more and 0.20 or less in terms of molar percentage based on oxides. That is, the ($K_2O/(Li_2O+Na_2O+K_2O)$) is preferably 0.05 or more, more preferably 0.07 or more, and still more preferably 0.08 or more, from the viewpoint of improving the weather resistance. On the other hand, the ($K_2O/(Li_2O+Na_2O+K_2O)$) is preferably 0.20 or less, more preferably 0.18 or less, and still more preferably 0.16 or less, from the viewpoint of improving the chemical strengthening properties.

From the viewpoint of preventing a rise in devitrification temperature and reducing the crystal growth rate, it is preferable to contain all of $Li_2O$, $Na_2O$, and $K_2O$. A total alkali represented by $R_2O(Li_2O+Na_2O+K_2O)$ is preferably 13.0% or more, more preferably 13.5% or more, still more preferably 14.0% or more, even more preferably 14.5% or more, and particularly preferably 15.0% or more. In addition, the content of $R_2O$ is preferably 18.0% or less, more preferably 17.5% or less, still more preferably 17.0% or less, even more preferably 16.5% or less, and particularly preferably 16.0% or less, from the viewpoint of improving the chemical durability.

$Y_2O_3$ is a component that reduces the crystal growth rate while increasing the surface compressive stress of the chemically strengthened glass. In the case where $Y_2O$ is contained, the content thereof is preferably more than 0%, more preferably 0.1% or more, still more preferably 0.2% or more, particularly preferably 0.5% or more, and even particularly preferably 1.0% or more. On the other hand, when the content is too large, it is difficult to enlarge the compressive stress layer during the chemical strengthening treatment. The content of $Y_2O_3$ is 5.0% or less, preferably 4.0% or less, more preferably 3.5% or less, still more preferably 3.2% or less, particularly preferably 3.0% or less, and most preferably 2.0% or less.

$ZrO_2$ is a component that increases the surface compressive stress of the chemically strengthened glass. In the case where $ZrO_2$ is contained, the content thereof is preferably more than 0%, more preferably 0.1% or more, still more preferably 0.15% or more, even more preferably 0.2% or more, particularly preferably 0.25% or more, even particularly preferably 0.3% or more, and most preferably more than 0.5%. On the other hand, when the content of $ZrO_2$ is too large, devitrification defects are likely to occur, and it is difficult to increase the compressive stress value during the chemical strengthening treatment. The content of $ZrO_2$ is preferably 5.0% or less, preferably 4.0% or less, more preferably 3.0% or less, still more preferably 2.0% or less, and particularly preferably 1.0% or less.

The total content of $ZrO_2$ and $Y_2O_3$ is preferably 5.0% or less, more preferably 4.0% or less, still more preferably 3.0% or less, and particularly preferably 2.5% or less, from the viewpoint of improving the initial meltability. The lower limit of the total content of $ZrO_2$ and $Y_2O_3$ is not particularly limited, and is preferably 0.5% or more, more preferably 0.7% or more, still more preferably 1.0% or more, and particularly preferably 1.2% or more, from the viewpoint of increasing the strength of the glass.

A ratio $[ZrO_2]/([ZrO_2]+[Y_2O_3])$ of $ZrO_2$ to the total content of $ZrO_2$ and $Y_2O_3$ is preferably 0.20 or more, preferably 0.25 or more, preferably 0.30 or more, more preferably 0.32 or more, still more preferably 0.35 or more, even more preferably 0.37 or more, and particularly preferably 0.40 or more. The $[ZrO_2]/([ZrO_2]+[Y_2O_3])$ is 0.70 or less, preferably 0.68 or less, more preferably 0.66 or less, still more preferably 0.64 or less, and particularly preferably 0.62 or less.

$ZrO_2$ and $Y_2O_3$ are known as nucleating agents in the case of being added alone, and since a eutectic of $ZrO_2$ and $Y_2O_3$ is formed by co-adding $ZrO_2$ with $Y_2O_3$, the devitrification temperature, the crystal growth rate, and the crystallization starting temperature can be controlled.

Further, when the $[ZrO_2]/([ZrO_2]+[Y_2O_3])$ is within the above range, diffusion of ions in the glass can be prevented, a rise in devitrification temperature can be prevented, and the devitrification can be prevented.

When the $[ZrO_2]/([ZrO_2]+[Y_2O_3])$ is within the above range, a temperature range where the glass is stabilized and nucleation occurs and a temperature range where crystal growth occurs are separated from each other without overlapping, a increase in crystal growth rate can be prevented, and the occurrence of defects can be prevented. In addition, when the $[ZrO_2]/([ZrO_2]+[Y_2O_3])$ is within the above range, a temperature range where nucleation occurs is shifted to the lower temperature side, a decrease in crystallization starting temperature can be prevented, and the production properties can be improved.

Particularly, in the embodiment 1, the ratio $[ZrO_2]/([ZrO_2]+[Y_2O_3])$ of $ZrO_2$ to the total content of $ZrO_2$ and $Y_2O_3$ is 0.30 or more, preferably 0.32 or more, more preferably 0.35 or more, still more preferably 0.37 or more, and particularly preferably 0.40 or more. In the embodiment 1, the $[ZrO_2]/([ZrO_2]+[Y_2O_3])$ is 0.70 or less, preferably 0.68 or less, more preferably 0.66 or less, still more preferably 0.64 or less, and particularly preferably 0.62 or less.

Particularly, in the embodiment 2, the ratio $[ZrO_2]/([ZrO_2]+[Y_2O_3])$ of $ZrO_2$ to the total content of $ZrO_2$ and $Y_2O_3$ is 0.20 or more, preferably 0.23 or more, more preferably 0.25 or more, and still more preferably 0.30 or more. In the embodiment 2, the $[ZrO_2]/([ZrO_2]+[Y_2O_3])$ is 0.70 or less, preferably 0.60 or less, more preferably 0.50 or less, still more preferably 0.45 or less, and particularly preferably 0.40 or less.

From the viewpoint of preventing nucleation, a value represented by $-25\times[ZrO_2]+100\times[Y_2O_3]$ is preferably 135 or less, and more preferably 133 or less, 130 or less, 125 or less, 120 or less, 115 or less, and 110 or less in order. The lower limit of the value represented by $-25\times[ZrO_2]+100\times[Y_2O_3]$ is not particularly limited, and is preferably 50 or more, more preferably 60 or more, still more preferably 70 or more, and particularly preferably 80 or more, from the viewpoint of preventing precipitation of $ZrO_2$-based defects during glass production.

From the viewpoint of reducing the defects of the glass, a value represented by $100\times[ZrO_2]+63\times[Y_2O_3]$ is preferably 180 or less, more preferably 175 or less, still more preferably 170 or less, even more preferably 165 or less, and particularly preferably 160 or less. The lower limit of the value represented by $100\times[ZrO_2]+63\times[Y_2O_3]$ is not particularly limited, and is preferably 100 or more, more preferably 110 or more, still more preferably 125 or more, and particularly preferably 130 or more, from the viewpoint of promoting nucleation.

MgO may be contained in order to reduce the viscosity during melting. In the case where MgO is contained, the content thereof is preferably 0.05% or more, more preferably 0.1% or more, still more preferably 0.2% or more, particularly preferably 0.9% or more, even particularly preferably more than 0.9%, and most preferably 1.0% or more. On the other hand, when the content of MgO is too large, it is difficult to enlarge the compressive stress layer during the chemical strengthening treatment. The content of MgO is preferably 7.0% or less, more preferably 6.5% or less, and still more preferably 5.0% or less, 4.0% or less, 3.8% or less, 3.0% or less, 2.0% or less, and 1.5% or less in order. When the content of MgO is particularly preferably 3.0% or less, the acid resistance can be improved.

When MgO is contained, phase transition of a crystal phase from β-quartz to β-spodumene can be prevented, and precipitation of β-spodumene crystals can be prevented. Therefore, in the embodiment 2, it is preferable to contain MgO. Particularly, in the second embodiment, it is preferable that MgO is contained in an amount of more than 0.9% and 7.0% or less. More preferred ranges are as described above.

CaO is a component that improves the meltability of the glass, and may be contained. In the case where CaO is contained, the content thereof is preferably 0.1% or more, more preferably 0.15% or more, and still more preferably 0.5% or more. On the other hand, when the content of CaO is excessive, it is difficult to increase the compressive stress value during the chemical strengthening treatment. The content of CaO is preferably 2.0% or less, more preferably 1.5% or less, still more preferably 1.0% or less, and even more preferably 0.8% or less.

In order to increase the stability of the glass, it is more preferable to contain at least one of MgO and CaO, and it is still more preferable to contain MgO. In the embodiment 1, the total content of MgO and CaO is 0.1% or more, preferably 0.2% or more, more preferably 0.3% or more, and still more preferably 0.35% or more. In the embodiment 2, the total content of MgO and CaO is more than 0.9%, preferably 1.0% or more, and particularly preferably 2.0% or more. In the embodiments 1 and 2, the total content of MgO and CaO is 7.0% or less, preferably 6.0% or less, 5.0% or less, 4.0% or less, 3.8% or less, and 3.0% or less in order, and more preferably 1.0% or less, in order to improve the chemical strengthening properties. Particularly, in the embodiment 1, it is still more preferably 0.8% or less, and even more preferably 0.7% or less.

When MgO is contained, phase transition of a crystal phase from β-quartz to β-spodumene can be prevented, and precipitation of β-spodumene crystals can be prevented. Therefore, in the embodiment 2, the total content of MgO and CaO is preferably 1.0% or more. More preferred ranges are as described above.

SrO is a component that improves the meltability of the glass, and may be contained. In the case where SrO is contained, the content thereof is preferably 0.1% or more, more preferably 0.15% or more, and still more preferably 0.5% or more. On the other hand, when the content of SrO is excessive, it is difficult to increase the compressive stress value during the chemical strengthening treatment. The content of SrO is preferably 3.0% or less, more preferably 2.0% or less, still more preferably 1.0% or less, and particularly preferably 0.5% or less.

BaO is a component that improves the meltability of the glass, and may be contained. In the case where BaO is contained, the content thereof is preferably 0.1% or more, more preferably 0.15% or more, and still more preferably 0.5% or more. On the other hand, when the content of BaO is excessive, it is difficult to increase the compressive stress value during the chemical strengthening treatment. The content of BaO is preferably 3.0% or less, more preferably 2.0% or less, still more preferably 1.0% or less, and particularly preferably 0.5% or less.

ZnO is a component that improves the meltability of the glass, and may be contained. In the case where ZnO is contained, the content thereof is preferably 0.1% or more, more preferably 0.15% or more, and still more preferably 0.5% or more. On the other hand, when the content of ZnO is excessive, it is difficult to increase the compressive stress value during the chemical strengthening treatment. The content of ZnO is preferably 3.0% or less, more preferably 2.0% or less, still more preferably 1.0% or less, and particularly preferably 0.5% or less.

lnW is a parameter representing the degree of mixing of oxides, which is calculated based on the contents of alkali metal oxides, alkaline earth metal oxides, and zinc oxide contained in the glass.

$$\ln W=\ln(([Li_2O]+[Na_2O]+[K_2O]+[MgO]+[CaO]+[SrO]+[BaO]+[ZnO])!/([Li_2O]!\times[Na_2O]!\times[K_2O]!\times[MgO]!\times[CaO]!\times[SrO]!\times[BaO]!\times[ZnO]!)) \quad \text{Formula (1)}$$

In the Formula (1), $[Li_2O]$, $[Na_2O]$, $[K_2O]$, [MgO], [CaO], [SrO], [BaO], and [ZnO] respectively represent a content of the components $Li_2O$, $Na_2O$, $K_2O$, MgO, CaO, SrO, BaO, and ZnO in terms of molar percentage based on oxides.

In addition, "!" indicates that a positive number is factorialized. For example, "[XO]!" means that the decimal places of the numerical value of the content of a component XO in terms of molar percentage based on oxides is rounded down to a positive number, and the positive number is factorialized. For example, in the case of containing 4.8 mol % of $Na_2O$, it is calculated as the factorial of "4", that is, 4×3×2×1.

When the value of lnW is large, the degree of mixing of the metal oxides is high, and devitrification of the glass can be prevented accordingly. On the other hand, when the lnW is too large, the chemical strengthening properties deteriorate.

The lnW is 10 or more, preferably 12 or more, more preferably 13 or more, and still more preferably 14 or more. The lnW is 20 or less, preferably 18 or less, and more preferably 17 or less.

$La_2O_3$ is not essential, but can be contained for the same reason as $Y_2O_3$. The content of $La_2O_3$ is preferably 0.1% or more, more preferably 0.2% or more, still more preferably 0.5% or more, and particularly preferably 0.8% or more. On the other hand, when the content of $La_2O_3$ is too large, it is difficult to enlarge the compressive stress layer during the chemical strengthening treatment. Therefore, the content thereof is preferably 5.0% or less, more preferably 3.0% or less, still more preferably 2.0% or less, and particularly preferably 1.5% or less.

$TiO_2$ is a component that is highly effective in preventing solarization of the glass, and may be contained. In the case where $TiO_2$ is contained, the content thereof is preferably 0.02% or more, more preferably 0.03% or more, still more preferably 0.04% or more, even more preferably 0.05% or more, and particularly preferably 0.06% or more. On the other hand, the content of $TiO_2$ is preferably 1.0% or less, more preferably 0.5% or less, and still more preferably 0.25% or less, from the viewpoint of preventing devitrification from occurring and the quality of the chemically strengthened glass from decreasing.

$B_2O_3$ is not essential, but may be contained for the purpose of reducing the brittleness of the glass and improving the crack resistance, or for the purpose of improving the meltability of the glass. The content of $B_2O_3$ is preferably 0.5% or more, more preferably 1.0% or more, and still more preferably 2.0% or more, in order to reduce the brittleness. On the other hand, the content of $B_2O_3$ is preferably 10% or less, since when it is too large, the acid resistance is likely to deteriorate. The content of $B_2O_3$ is more preferably 6.0% or less, still more preferably 4.0% or less, and particularly preferably 2.0% or less. From the viewpoint of preventing the generation of striae during melting, it is more preferable that $B_2O_3$ is not substantially contained.

$P_2O_5$ is not essential, but may be contained for the purpose of enlarging the compressive stress layer during chemical strengthening. In the case where $P_2O_5$ is contained, the content thereof is preferably 0.5% or more, more preferably 1.0% or more, and still more preferably 2.0% or more. On the other hand, the content of $P_2O_5$ is preferably 6.0% or less, more preferably 4.0% or less, and still more preferably 2.0% or less, from the viewpoint of improving the acid resistance. From the viewpoint of preventing the generation of striae during melting, it is more preferable that $P_2O_5$ is not substantially contained.

$Nb_2O_5$, $Ta_2O_5$, $Gd_2O_3$, and $CeO_2$ are components that have the effect of preventing solarization of the glass and that improve the meltability, and may be contained. In the case where these components are contained, the content of each component is preferably 0.03% or more, more preferably 0.1% or more, still more preferably 0.5% or more, even more preferably 0.8% or more, and particularly preferably 1.0% or more. On the other hand, when the content of these components is too large, it is difficult to increase the compressive stress value during the chemical strengthening treatment. Therefore, the content is preferably 3.0% or less, more preferably 2.0% or less, still more preferably 1.0% or less, and particularly preferably 0.5% or less.

$Fe_2O_3$ absorbs heat rays and thus has the effect of improving the meltability of the glass, and is preferably contained when mass producing the glass using a large melting furnace. In this case, the content thereof is preferably 0.002% or more, more preferably 0.005% or more, still more preferably 0.007% or more, and particularly preferably 0.01% or more in wt % in terms of oxide. On the other hand, when $Fe_2O_3$ is excessively contained, coloration occurs, and thus the content thereof is preferably 0.3% or less, more preferably 0.04% or less, still more preferably 0.025% or less, and particularly preferably 0.015% or less in wt % in terms of oxide, from the viewpoint of improving the transparency of the glass.

Note that, here, all iron oxides in the glass have been described as $Fe_2O_3$, but actually, Fe(III) in an oxidized state and Fe(II) in a reduced state are mixed generally. Among them, Fe(III) causes yellow coloring, Fe(II) causes blue coloring, and green coloring occurs in the glass depending on the balance therebetween.

Further, other coloring components may be added as long as achievement of desired chemical strengthening properties is not inhibited. Preferred examples of the other coloring components include $CO_3O_4$, $MnO_2$, NiO, CuO, $Cr_2O_3$, $V_2O_5$, $Bi_2O_3$, $SeO_2$, $CeO_2$, $Er_2O_3$, and $Nd_2O_3$.

The content of the coloring component containing $Fe_2O_3$ is preferably 5.0% or less in total in terms of molar percentage based on oxides. When the content is more than 5.0%, the glass may be likely to be devitrified. The content of the coloring component is preferably 3.0% or less, and more preferably 1.0% or less. In the case where it is desired to increase the transmittance of the glass, it is preferable that these components are not substantially contained.

$SO_3$, a chloride, and a fluoride may be appropriately contained as a refining agent or the like during melting of the glass. $As_2O_3$ is preferably not contained. In the case where $Sb_2O_3$ is contained, the content thereof is preferably 0.3% or less, and more preferably 0.1% or less, and it is most preferably that $Sb_2O_3$ is not contained.

Moreover, as other embodiments, the glass composition may be in the following range. For the description of the glass composition and the preferred range of the glass composition, the description from the paragraph "Hereinafter, the glass composition will be described." to the paragraph immediately preceding this paragraph is referred to, and this is a mode in which this range is expanded.

The content of $SiO_2$ may be 55.0% or more, and may be 75.0% or less.

The content of $Al_2O_3$ may be 8.0% or more, and may be 20.0% or less.

The content of $Li_2O$ may be 3.0% or more, and may be 15.0% or less.

The content of $K_2O$ may be 0.0% or more.

The content of MgO may be 0.0% or more.

The content of CaO may be 0.0% or more, and may be 10.0% or less.

The content of SrO may be 0.0% or more, and may be 5.0% or less.

The content of ZnO may be 0.0% or more, and may be 5.0% or less.

The content of $TiO_2$ may be 0.0% or more, and may be 3.0% or less.

The content of $ZrO_2$ may be 0.0% or more.

$SnO_2$ may be contained from the viewpoint of refining bubbles in the glass. The content of $SnO_2$ is 0.0% or more, preferably 0.1% or more, more preferably 0.2% or more, and still more preferably 0.3% or more. In addition, the content of $SnO_2$ is 1% or less, preferably 0.8% or less, more preferably 0.7% or less, and still more preferably 0.5% or less since $SnO_2$ may volatilize and becomes a defect.

The content of $P_2O_5$ may be 0.0% or more.

The content of $B_2O_3$ may be 0.0% or more.

The content of $Y_2O_3$ may be 0.0% or more, and may be 3.0% or less.

The content of BaO may be 0.0% or more.

The content of $CeO_2$ may be 0.0% or more.

The content of $Fe_2O_3$ may be 0.0% or more.

A ratio $[K_2O]/[Na_2O]$ of the content of $K_2O$ to the content of $Na_2O$ is preferably close to 1 from the viewpoint of the meltability of the glass. The $[K_2O]/[Na_2O]$ is preferably 0 or more, and more preferably 0.3 or more. The $[K_2O]/[Na_2O]$ is preferably 1.8 or less, and more preferably 1.4 or less.

A ratio $[ZrO_2]/([Y_2O_3]+[ZrO_2])$ of the content of $ZrO_2$ to the total content of $[Y_2O_3]$ and $[ZrO_2]$ is preferably 0 or more, more preferably 0.2 or more, and still more preferably 0.3 or more. The $[ZrO_2]/([Y_2O_3]+[ZrO_2])$ is preferably 0.7 or less, more preferably 0.6 or less, and still more preferably 0.5 or less.

The total content of $Y_2O_3$ and $ZrO_2$ is preferably 0.0% or more, and more preferably 1.0% or more. The total content of $Y_2O_3$ and $ZrO_2$ is preferably 3.0% or less, and more preferably 2.4% or less A value represented by $[Al_2O_3]-[Na_2O]-[K_2O]+[Li_2O]$ is preferably 15.0% or more, and more preferably 17% or more. The value represented by $[Al_2O_3]-[Na_2O]-[K_2O]+[Li_2O]$ is preferably 26.0% or less, and more preferably 24% or less.

The total content of MgO and CaO is preferably 0.1% or more, and more preferably 0.5% or more. The total content of MgO and CaO is preferably 20.0% or less, and more preferably 15% or less.

<<Devitrification Temperature>>

The glass according to the present invention preferably has a devitrification temperature of 1300° C. or lower. The devitrification temperature is more preferably 1280° C. or lower, and most preferably 1250° C. or lower. The devitrification temperature is preferably 1240° C. or lower, more preferably 1230° C. or lower, still more preferably 1220° C. or lower, and particularly preferably 1210° C. or lower. The lower limit of the devitrification temperature is not particularly limited, and is generally 1100° C. or higher.

In the embodiment 1, the devitrification temperature is preferably 1300° C. or lower. It is more preferably 1280° C. or lower, and most preferably 1250° C. or lower. The devitrification temperature is preferably 1240° C. or lower, more preferably 1230° C. or lower, still more preferably 1220° C. or lower, and particularly preferably 1210° C. or lower. The lower limit of the devitrification temperature is not particularly limited, and is generally 1100° C. or higher.

In the embodiment 2, the devitrification temperature is preferably 1300° C. or lower. It is more preferably 1280° C. or lower, and most preferably 1250° C. or lower. The lower limit of the devitrification temperature is not particularly limited, and is generally 1100° C. or higher.

When the devitrification temperature is 1300° C. or lower, particularly preferably 1250° C. or lower, the glass can be molded stably and the production properties can be improved. Specifically, for example, in the case of molding a glass by a float method, if crystals are formed before a molten glass is poured into a float bath, the crystals erode bricks that constitute the float bath. When the glass according to the present invention has a devitrification temperature of 1300° C. or lower, preferably 1250° C. or lower, erosion of the bricks can be prevented.

The devitrification temperature of the glass in the present invention is a minimum value of a temperature at which crystals are not precipitated on the surface and the inside of the glass when crushed glass particles of 2 mm to 3 mm are charged into a platinum dish and subjected to a heat treatment for 17 hours in an electric furnace controlled at a constant temperature and observation is carried out using an optical microscope after the heat treatment.

<<Glass Transition Point Tg, Crystallization Starting Temperature Tcs, and Crystallization Peak Temperature Tc>>

The measurement by using a differential scanning calorimeter (DSC) in the present invention is performed by grinding the glass in an agate mortar and heating about 70 mg of a powder having a uniform particle diameter of 106 μm to 180 μm from room temperature to 1200° C. at a heating rate of 10° C./min.

The glass according to the present invention has a crystallization starting temperature Tcs of preferably 790° C. or higher, more preferably 800° C. or higher, still more preferably 810° C. or higher, even more preferably 815° C. or higher, particularly preferably 820° C. or higher, and most preferably 825° C. or higher, as measured by DSC. The upper limit of the crystallization starting temperature is not particularly limited, and is generally 900° C. or lower.

When the crystallization starting temperature Tcs is 790° C. or higher, the production properties are improved. Specifically, for example, in molding including a three-dimensional shape (for example, 2.5D or 3D molding, hereinafter, also abbreviated as three-dimensional molding) in which a glass is molded into a sheet and then subjected to a heat treatment, when the temperature is raised from room temperature to the molding temperature, it passes through the nucleation temperature, which tends to cause defects due to crystallization. When the glass according to the present invention has a crystallization starting temperature Tcs of 790° C. or higher, when the temperature is raised from room temperature to the molding temperature, the molding can be performed without passing through the nucleation temperature, and the occurrence of defects can be prevented.

FIG. 1 shows a schematic diagram illustrating the Tg, the Tcs, and the Tc in the present invention. The glass transition point Tg in the present invention is an intersection point of a curve obtained by DSC with an auxiliary line as shown in FIG. 1. The crystallization starting temperature Tcs of the glass in the present invention refers to the temperature at a peak apex when the temperature of the glass is raised at 10° C./min using DSC.

The glass according to the present invention has a ratio (Tcs+273.15)/(Tg+273.15) of the crystallization starting temperature Tcs to the glass transition point Tg of preferably 1.10 or more, more preferably 1.15 or more, still more preferably 1.20 or more, and particularly preferably 1.25 or more. When the (Tcs+273.15)/(Tg+273.15) is 1.10 or more, the occurrence of defects in the three-dimensional molding can be prevented and the molding properties can be improved. The upper limit of the (Tcs+273.15)/(Tg+273.15) is not particularly limited, and is generally preferably 1.6 or less from the viewpoint of the moldability of the glass. Note that, the unit of the Tcs and the Tg in the (Tcs+273.15)/(Tg+273.15) is "° C.", and the "(Tcs+273.15)/(Tg+273.15)" is the same as "Tcs/Tg" in the case where the unit is "K".

The glass according to the present invention has a value (Tcs-Tg) obtained by subtracting the glass transition point Tg from the crystallization starting temperature Tcs of preferably 180° C. or more, and more preferably 200° C. or more. It is preferably 210° C. or more, more preferably 215° C. or more, still more preferably 225° C. or more, and particularly preferably 230° C. or more. When the (Tcs-Tg) is 200° C. or more, the occurrence of defects in the three-dimensional molding can be prevented and the molding properties can be improved. The upper limit of the (Tcs-Tg) is not particularly limited, and is generally preferably 400° C. or less from the viewpoint of the moldability of the glass.

In the embodiment 1, the glass according to the present invention has a value (Tcs-Tg) obtained by subtracting the glass transition point Tg from the crystallization starting temperature Tcs of preferably 200° C. or more, preferably 210° C. or more, more preferably 215° C. or more, still more preferably 225° C. or more, and particularly preferably 230° C. or more. In the embodiment 2, the glass according to the present invention has a value (Tcs-Tg) obtained by subtracting the glass transition point Tg from the crystallization starting temperature Tcs of preferably 180° C. or more, and more preferably 185° C. or more.

The glass transition point Tg is preferably 500° C. or higher, more preferably 520° C. or higher, and still more preferably 540° C. or higher, from the viewpoint of reducing warpage after chemical strengthening. From the viewpoint of facilitating float molding, the glass transition point Tg is preferably 750° C. or lower, more preferably 700° C. or lower, still more preferably 650° C. or lower, particularly preferably 600° C. or lower, and most preferably 580° C. or lower.

The glass according to the present invention has a crystallization peak temperature Tc of preferably 790° C. or higher, more preferably 800° C. or higher, and still more preferably 810° C. or higher. When the crystallization peak temperature Tc is 790° C. or higher, the glass can be stably molded. It is most preferable that no crystallization peak is observed. The upper limit of the crystallization peak temperature Tc is not particularly limited, and is generally 950° C. or lower.

<<Crystal Growth Rate>>

In the present invention, in the embodiment 2, it can be seen that, when MgO is contained, the phase transition of the crystal phase from β-quartz to β-spodumene can be prevented, and the precipitation of β-spodumene crystals can be prevented. Therefore, in the embodiment 2, even when the temperature is held at 1000° C. for 30 minutes, the precipitation of β-spodumene can be prevented.

In addition, in the embodiment 2, it can also be seen that, the crystal growth rate is reduced.

In the embodiment 2, only the β-quartz solid solution is a first precipitated phase, and the crystal growth rate of the R-quartz solid solution at 1000° C. is preferably 4000 μm/hr or less, more preferably 3800 μm/hr or less, still more preferably 3500 μm/hr or less, particularly preferably 3200 μm/hr or less, and most preferably 2700 μm/hr or less.

As another embodiment, in the embodiment 1 of the present invention, it can be seen that, in the case where the temperature is held at 1000° C. for 30 minutes, the β-quartz solid solution and the β-spodumene coexist and precipitate.

In addition, in the embodiment 2, it can be seen that, the β-quartz solid solution and the β-spodumene coexist and precipitate, but the crystal growth rate can be reduced. In the embodiment 1, the crystal growth rate of the β-quartz solid solution at 1000° C. is preferably 600 μm/hr or less, more preferably 550 μm/hr or less, still more preferably 500 μm/hr or less, particularly preferably 450 μm/hr or less, even particularly preferably 400 μm/hr or less, most preferably 350 μm/hr or less.

The reason why the preferred ranges of the crystal growth rate are different in the case where only the β-quartz solid solution is the first precipitated phase and the case where the R-quartz solid solution and the β-spodumene coexist and precipitate is that the β-spodumene undergoes phase transformation from the β-quartz solid solution.

In a glass molding step, defects occur when crystallization occurs in the glass. For example, in the case of molding by a float method, the crystallization that occurs in the float bath occurs when the temperature range where nucleation occurs overlaps the temperature range where crystal growth occurs, since the temperature is lowered from a high temperature.

In a general glass, the temperature range where nucleation occurs does not overlap the temperature range where crystal growth occurs. However, as in the glass according to the present invention, in a glass containing a large amount of $Al_2O_3$ and $Li_2O$, the temperature range where nucleation occurs tend to overlap the temperature range where crystal growth occurs at around 1000° C. Here, even when the nucleation overlaps the crystal growth rate, this does not cause a defect as long as the crystal growth rate is slow. Therefore, when the crystal growth rate of the β-quartz solid solution at 1000° C. is 600 μm/hr or less, crystallization during the molding step can be prevented.

In the present description, as will be described later in Examples, the crystal growth rate of the β-quartz solid solution at 1000° C. is determined by holding a large number of glass samples at 1000° C. for 30 minutes, measuring the length of crystals in the glass using a polarizing microscope, and calculating the average value. The crystal growth rate of the β-spodumene at 1000° C. is determined by the same method.

A "β-OH value" is determined according to the Formula (1) based on a transmittance $X_1$(%) at a reference wavelength of 4000 $cm^{-1}$, a minimum transmittance $X_2$ (%) near 3570 $cm^{-1}$, which is the absorption wavelength of the hydroxy group, as measured by a FT-TR method, and a thickness t (unit: mm) of a glass sheet.

$$\beta\text{-OH value}=(1/t)\log_{10}(X_1/X_2) \quad (1)$$

Note that, the β-OH value can be adjusted by adjusting the amount of water contained in the glass raw material and melting conditions.

The glass according to the present invention has a β-OH value of preferably 0.1 $mm^{-1}$ or more, more preferably 0.15 $mm^{-1}$ or more, still more preferably 0.2 $mm^{-1}$ or more, particularly preferably 0.22 $mm^{-1}$ or more, and most preferably 0.25 $mm^{-1}$ or more.

The β-OH value is an index of the amount of water in the glass. A glass having a large β-OH value has a low softening point and tends to be easier to bend. On the other hand, from the viewpoint of increasing the strength of the glass by chemical strengthening, when the β-OH value of the glass increases, the surface compressive stress (CS) value after the chemical strengthening treatment decreases, making it difficult to increase the strength. Therefore, the β-OH value is preferably 0.5 $mm^{-1}$ or less, more preferably 0.4 $mm^{-1}$ or less, and still more preferably 0.3 $mm^{-1}$ or less.

The glass according to the present invention has a Na_DOL/K_DOL, which is a ratio of Na_DOL to K_DOL defined below, of preferably 26 or less, and more preferably 25 or less, 24 or less, 23 or less, 22 or less, 21 or less, and 20 or less in order, from the viewpoint that K does not enter the glass and the surface strength does not increase in the case of performing a first stage of chemical strengthening using a Na salt and a second stage of chemical strengthening using a Li—K mixed salt. The Na_DOL/K_DOL is preferably 15 or more, and more preferably 16 or more, 16.5 or more, 17 or more, 17.5 or more, and 18 or more in order, from the viewpoint that too much K gets into the glass and the glass self-destructs in the case of performing a first stage of chemical strengthening using a Na salt and a second stage of chemical strengthening using a Li—K mixed salt.

K_DOL: a compressive stress layer depth of a chemically strengthened glass obtained by subjecting the glass to ion exchange using a molten salt made of 100% potassium nitrate Na_DOL: a compressive stress layer depth of a chemically strengthened glass obtained by subjecting the glass to ion exchange using a molten salt made of 100% sodium nitrate here, times and temperatures of the ion exchange in calculating the K_DOL and the Na_DOL are same.

The glass according to the present invention has a fracture toughness value K1c of preferably 0.800 MPa·$m^{1/2}$ or more, more preferably 0.810 MPa·$m^{1/2}$ or more, still more preferably 0.820 MPa·$m^{1/2}$ or more, particularly preferably 0.830 MPa·$m^{1/2}$ or more, and most preferably 0.840 MPa·$m^{1/2}$ or more, from the viewpoint of improving the impact resistance. The upper limit of the fracture toughness value of the glass according to the present invention is not particularly limited, and is typically 1.0 MPa·$m^{1/2}$ or less.

In the case where the glass according to the present invention is a sheet-shaped glass sheet, a thickness (t) thereof is, for example, preferably 2 mm or less, more preferably 1.5 mm or less, still more preferably 1 mm or less, even more preferably 0.9 mm or less, particularly preferably 0.8 mm or less, and most preferably It is 0.7 mm or less, from the viewpoint of improving the chemical strengthening effect. In addition, the thickness is, for example, preferably 0.1 mm or more, more preferably 0.2 mm or more, still more preferably 0.4 mm or more, and particularly preferably 0.5 mm or more, from the viewpoint of obtaining a sufficient strength increasing effect through a chemical strengthening treatment.

The shape of the glass according to the present invention may be a shape other than a sheet shape depending on a product, an application, or the like to which the glass is applied. In addition, the glass sheet may have an edged shape or the like in which the thickness of an outer periphery is different. The form of the glass sheet is not limited thereto, and for example, two main surfaces may not be parallel to each other, and all or a part of one or both of the two main surfaces may be curved surfaces. More specifically, the glass sheet may be, for example, a flat sheet-shaped glass sheet having no warpage or a curved glass sheet having a curved surface.

<Production Method>

The glass according to the present embodiment can be produced by a general method. For example, raw materials of components of the glass are blended, and then heated and melted in a glass melting furnace. Thereafter, the glass is homogenized by a known method and molded into a desired shape such as a glass sheet, followed by annealing.

Examples of a molding method for a glass sheet include a float method, a press method, a fusion method, and a down-draw method. Particularly, a float method suitable for mass production is preferred. As a continuous molding method other than the float method, for example, a fusion method and a down-draw method are also preferred.

Thereafter, the molded glass is ground and polished as necessary to form a glass substrate. Note that, in the case of cutting or chamfering the glass substrate into a predetermined shape and size, it is preferable to perform cutting or chamfering of the glass substrate before a chemical strengthening treatment to be described later is performed since a compressive stress layer is also formed on an end surface by the subsequent chemical strengthening treatment.

<Chemically Strengthened Glass>

A chemically strengthened glass according to the present invention includes a compressive stress layer on a surface layer, and the base glass composition is within the glass composition range of the above glass. The chemically strengthened glass according to the present invention can be produced by subjecting the obtained glass sheet to a chemical strengthening treatment, followed by washing and drying. The chemically strengthened glass has dimensions that can be molded using existing molding methods, and is ultimately cut into a size suitable for the intended use.

The chemical strengthening treatment can be performed by a known method. In the chemical strengthening treatment, a glass sheet is brought into contact with a melt of a metal salt (for example, potassium nitrate) containing metal ions having a large ion radius (typically, K ions) by immersion or the like. Accordingly, metal ions having a small ion radius (typically, Na ions or Li ions) in the glass sheet are substituted with the metal ions having a large ion radius (typically, K ions for Na ions, and Na ions and K ions for Li ions).

The chemical strengthening treatment, that is, an ion exchange treatment, can be performed, for example, by immersing a glass sheet in a molten salt such as potassium nitrate heated to 360° C. to 600° C. for 0.1 to 500 hours. Note that, the heating temperature of the molten salt is preferably 375° C. or higher, and preferably 500° C. or lower. The immersion time of the glass sheet in the molten salt is preferably 0.3 hours or longer, and preferably 200 hours or shorter.

Examples of the molten salt for performing the chemical strengthening treatment include a nitrate, a sulfate, a carbonate, and a chloride. Among them, examples of the nitrate include lithium nitrate, sodium nitrate, potassium nitrate, cesium nitrate, and silver nitrate. Examples of the sulfate include lithium sulfate, sodium sulfate, potassium sulfate, cesium sulfate, and silver sulfate. Examples of the carbonate include lithium carbonate, sodium carbonate, and potassium carbonate. Examples of the chloride include lithium chloride, sodium chloride, potassium chloride, cesium chloride, and silver chloride. These molten salts may be used alone or in combination of plural types thereof.

In the present embodiment, the treatment conditions of the chemical strengthening treatment may be appropriately selected in consideration of the properties and composition of the glass, the type of the molten salt, chemical strengthening properties such as the surface compressive stress and the depth of the compressive stress layer desired for the chemically strengthened glass to be finally obtained, and the like.

In the present embodiment, the chemical strengthening treatment may be performed only once, or may be performed a plurality of times under two or more different conditions (multistage strengthening). Here, for example, a chemical strengthening treatment is performed under a condition in which DOL is large and CS is relatively small, as a first stage of chemical strengthening treatment. Thereafter, a chemical strengthening treatment is performed under a condition in which DOL is small and CS is relatively large, as a second stage of chemical strengthening treatment. In this case, an internal tensile stress area (St) can be reduced while increasing CS of an outermost surface of the chemically strengthened glass, and the internal tensile stress (CT) can be reduced.

The chemically strengthened glass according to the present invention has a surface compressive stress value of preferably 600 MPa or more, more preferably 700 MPa or more, and still more preferably 800 MPa or more, for example, in the case the thickness of the glass is 0.7 mm. The chemically strengthened glass according to the present invention has a compressive stress layer depth of generally preferably 60 μm or more, more preferably 70 μm or more, and still more preferably 80 μm or less. When the compressive stress layer depth is 60 μm or more, the strength is increased.

<Application>

The glass according to the present invention or the chemically strengthened glass according to the present invention obtained by chemically strengthening the same is useful as, for example, a cover glass. In addition, the glass or the chemically strengthened glass is particularly useful as, for example, a cover glass for use in mobile devices such as a mobile phone, a smartphone, a personal digital assistant (PDA), and a tablet terminal. Further, the glass or the chemically strengthened glass is also useful for, for example, applications which are not intended to be carried such as a cover glass of a display device such as a television (TV), a personal computer (PC), and a touch panel, an elevator wall surface, or a wall surface (full-screen display) of a construction such as a house and a building, a building material such as a window glass, a table top, an interior of an automobile, an airplane, or the like, and a cover glass thereof, and a casing having a curved surface shape that is not a sheet shape by bending or molding.

EXAMPLES

Hereinafter, the present invention will be described with reference to Examples, but the present invention is not limited thereto. Example 1, Example 3 to Example 15, Example 18 to Example 20, Example 23 to Example 24, and Example 25 are Inventive Examples, and Example 2, Example 16, Example 17, Example 21, and Example 22 are Comparative Examples.

(Preparation and Evaluation of Glass for Chemical Strengthening)

A glass sheet was produced by melting in a platinum crucible so as to have each of glass compositions in terms of molar percentage based on oxides shown in Table 1. Generally used glass raw materials such as an oxide, a hydroxide, a carbonate, and a nitrate were appropriately selected and weighed to give 1000 g of glass. Next, the mixed raw materials were charged into a platinum crucible, followed by charging into a resistance heating electric furnace at 1500° C. to 1700° C., melted for about 3 hours, defoamed, and homogenized. The obtained molten glass was poured into a mold, maintained at a temperature of the glass transition point+50° C. for 1 hour, and then cooled to room temperature at a rate of 0.5° C./min, to obtain a glass block. The obtained glass block was cut and ground, and finally both surfaces were mirror-finished to give a sheet-shaped glass (glass for chemical strengthening) having a length of 50 mm, a width of 50 mm, and a thickness of 0.7 mm.

The physical properties of the obtained glass for chemical strengthening were evaluated as follows. The results are shown in Tables 1 and 2.

<β-OH>

As an index of the water content in the glass before chemical strengthening, the β-OH value was measured using an FT-IR spectrometer (Nicolet iS10, manufactured by Thermo Fisher Scientific).

<Crystallization Starting Temperature Tcs, Glass Transition Point Tg, and Crystallization Peak Temperature Tc>

The crystallization starting temperature Tcs, the glass transition point Tg, and the crystallization peak temperature Tc of the glass were measured using a differential scanning calorimeter (DSC). The measurement by using DSC was performed by grinding the glass in an agate mortar and heating about 70 mg of a powder having a uniform average particle diameter of 106 μm to 180 μm from room temperature to 1200° C. at a heating rate of 10° C./min. As shown in FIG. 1, the Tcs, the Tg, and the Tc were determined from the obtained DSC curve. Note that, "Tcs/Tg" in the tables means "Tcs/Tg" in the case where the unit is "K", and this is the same as "(Tcs+273.15)/(Tg+273.15)" in the case where the unit of the Tcs and the Tg is "° C.".

<Crystal Growth Rate>

The crystal growth rate caused by a devitrification phenomenon was measured using the following procedure.

A glass piece was crushed in a mortar and classified, and passed through a 3.35 mm mesh sieve, and glass particles that did not pass through a 2.36 mm mesh sieve were washed with ion exchanged water, dried, and used in the test.

One glass particle was placed on each concave portion of an elongated platinum cell having a large number of concave portions, and heated in an electric furnace at 1000° C. to 1100° C. until the surface of the glass particle was melted and smoothed.

Next, the glass was charged into a temperature gradient furnace maintained at a predetermined temperature (1000° C.), subjected to a heat treatment for a certain period of time (t hours), and then taken out at room temperature and quenched. According to this method, it is possible to heat a large number of glass particles at the same time by placing an elongated container in the temperature gradient furnace.

The glass after the heat treatment was observed with a polarizing microscope (ECLIPSE LV100ND, manufactured by Nikon Corporation), and a diameter (L μm) of the largest crystal among the observed crystals was measured. Observation was performed under the conditions of 10× ocular lens, 5× to 100× objective lens, transmitted light, and polarized light observation. Since the crystals generated by devitrification can be considered to grow isotropically, the devitrification (crystal) growth rate is L/(2t) [unit: μm/h].

However, as crystals to be measured, crystals not precipitated from an interface with the container were selected. This is because devitrification growth at a metal interface tends to be different from a general devitrification growth behavior occurring inside the glass or at a glass-atmosphere interface.

<Devitrification Temperature>

The crushed glass particles were charged into a platinum dish and subjected to a heat treatment in an electric furnace controlled to a constant temperature for 17 hours. The glass after the heat treatment was observed with a polarizing microscope, and the devitrification temperature was estimated by a method for evaluating the presence or absence of devitrification.

<Crystallization Temperature Tx and Crystallization Peak Temperature Tc>

The crystallization temperature Tx and the crystallization peak temperature Tc were measured by crushing about 70 mg of glass and grinding the glass in an agate mortar and using a differential scanning calorimeter (DSC) from room temperature to 1000° C. at a heating rate of 10° C./min.

(Fracture Toughness Value K1c)

The fracture toughness value K1c (unit: $MPa \cdot m^{1/2}$) was measured by the DCDC method. With reference to the method described in M. Y. He, M. R. Turner and A. G. Evans, Acta Metall. Mater. 43 (1995) 3453, by the DCDC method, a sample having a shape shown in FIG. 2 and Autograph AGS-X5KN manufactured by SHIMADZU Corporation were used, a K1-v curve showing the relationship between the stress intensity factor K1 (unit: $MPa \cdot m^{1/2}$) and the crack progress rate v (unit: m/s) as shown in FIG. 3 was measured, the obtained data for the Region III was regressed and extrapolated using a linear equation, and the stress intensity factor K1 at 0.1 m/s was set as the fracture toughness value K1c.

(Preparation and Evaluation of Chemically Strengthened Glass)

The glass for chemical strengthening obtained in the above procedure was subjected to a chemical strengthening (ion exchange) treatment using a molten salt made of 100 mass % sodium nitrate or a molten salt made of 100 mass % potassium nitrate. As conditions for the chemical strengthening, the strengthening time was 240 minutes and the temperature was 380° C.

The surface compressive stress (value) (CS) and the compressive stress layer depth (DOL) of the obtained chemically strengthened glass were measured using a surface stress meter (surface stress meter FSM-6000 manufactured by Orihara Industrial Co., Ltd.). The internal CS and DOL were measured using a scattered light photoelastic stress meter (SLβ-1000). In the tables, "Na_CS" and "Na_DOL" respectively represent the surface compressive stress (MPa) and the compressive stress layer depth (μm) of the chemically strengthened glass obtained using a molten salt made of 100% sodium nitrate. In addition, in the tables, "K_CS" and "K_DOL" respectively represent the surface compressive stress (MPa) and the compressive stress layer depth (μm) of the chemically strengthened glass obtained using a molten salt made of 100% potassium nitrate. Further, blank spaces and "-" in the tables mean unmeasured values, and italic letters mean calculated values.

TABLE 1

| (mol %) | Ex. 1 | Ex. 2 | Ex. 3 | Ex. 4 | Ex. 5 | Ex. 6 | Ex. 7 |
|---|---|---|---|---|---|---|---|
| $SiO_2$ | 68.9 | 69.1 | 69.1 | 68.7 | 69.1 | 68.2 | 68.5 |
| $Al_2O_3$ | 12.0 | 12.0 | 12.0 | 12.2 | 11.8 | 12.0 | 12.0 |
| MgO | 0.1 | 0.1 | 0.1 | 0.1 | 0.1 | 0.8 | 0.1 |
| CaO | 0.1 | 0.1 | 0.1 | 0.1 | 0.1 | 0.1 | 0.5 |
| BaO | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 |
| $TiO_2$ | 0.1 | 0.1 | 0.1 | 0.1 | 0.1 | 0.1 | 0.1 |
| $ZrO_2$ | 0.7 | 0.5 | 0.7 | 0.7 | 0.7 | 0.7 | 0.7 |
| $Y_2O_3$ | 1.3 | 1.3 | 1.1 | 1.3 | 1.3 | 1.3 | 1.3 |

TABLE 1-continued

| | | | | | | | |
|---|---|---|---|---|---|---|---|
| $Li_2O$ | 10.8 | 10.8 | 10.8 | 10.8 | 10.8 | 10.8 | 10.8 |
| $Na_2O$ | 4.8 | 4.8 | 4.8 | 4.8 | 4.8 | 4.8 | 4.8 |
| $K_2O$ | 1.2 | 1.2 | 1.2 | 1.2 | 1.2 | 1.2 | 1.2 |
| ZnO | 0.0 | 0.0 | 0.0 | 0.0 | 0.0 | 0.0 | 0.0 |
| $SiO_2 + Al_2O_3$ | 80.9 | 81.1 | 81.1 | 80.9 | 80.9 | 80.2 | 80.5 |
| $R_2O$ | 16.8 | 16.8 | 16.8 | 16.8 | 16.8 | 16.8 | 16.8 |
| $ZrO_2/(ZrO_2 + Y_2O_3)$ | 0.35 | 0.28 | 0.39 | 0.35 | 0.35 | 0.35 | 0.35 |
| MgO + CaO | 0.2 | 0.2 | 0.2 | 0.2 | 0.2 | 0.9 | 0.6 |
| $-25ZrO_2 + 100Y_2O_3$ | 113 | 118 | 93 | 113 | 113 | 113 | 113 |
| $100ZrO_2 + 63Y_2O_3$ | 152 | 132 | 139 | 152 | 152 | 152 | 152 |
| βOH (/mm) | 0.254 | 0.296 | 0.242 | 0.249 | 0.272 | 0.267 | 0.341 |
| Devitrification temperature (° C.) | 1210 | 1210 | 1180 | 1200 | 1210 | 1200 | 1200 |
| Tcs (° C.) | 812 | 792 | 807 | 831 | 833 | 810 | 820 |
| Tx [° C.] | 818 | 799 | 814 | 836 | 838 | 815 | 824 |
| Tc (° C.) | 833 | 813 | 827 | 850 | 852 | 831 | 839 |
| Tg (DSC) (° C.) | 597 | 593 | 594 | 603 | 589 | 590 | 586 |
| Tcs − Tg (DSC) | 215 | 200 | 214 | 228 | 244 | 220 | 234 |
| Tcs/Tg (DSC) | 1.36 | 1.34 | 1.36 | 1.38 | 1.41 | 1.37 | 1.40 |
| Na_CS | 376 | 377 | 368 | 380 | 350 | 384 | 387 |
| Na_DOL | 101 | 98 | 100 | 100 | 98 | 94 | 94 |
| K_CS | 1179 | 1160 | 1165 | 1193 | 1175 | 1215 | 1202 |
| K_DOL | 4.4 | 4.4 | 4.5 | 4.4 | 4.4 | 3.9 | 3.8 |
| Na/K DOL ratio | 23.0 | 22.3 | 22.2 | 22.7 | 22.3 | 24.1 | 24.7 |
| Crystal growth rate (μm/hr) of β-quartz solid solution at 1000° C. | 269 | 426 | 436 | 476 | 385 | 512 | 418 |
| Crystal growth rate (μm/hr) of β-spodumene at 1000° C. | 882 | 1100 | 993 | | 796 | 1036 | 924 |
| InW | 15.2 | 15.2 | 15.2 | 15.2 | 15.2 | 15.2 | 15.2 |
| K1c (MPa · $m^{1/2}$) | 0.835 | 0.809 | 0.814 | 0.813 | 0.811 | 0.812 | 0.812 |

| (mol %) | Ex. 8 | Ex. 9 | Ex. 10 | Ex. 11 | Ex. 12 | Ex. 13 |
|---|---|---|---|---|---|---|
| $SiO_2$ | 67.9 | 69.6 | 68.6 | 69.2 | 68.7 | 69.1 |
| $Al_2O_3$ | 12.0 | 12.0 | 12.0 | 12.0 | 12.0 | 12.0 |
| MgO | 0.1 | 0.1 | 0.1 | 0.1 | 0.1 | 0.1 |
| CaO | 0.1 | 0.1 | 0.1 | 0.1 | 0.1 | 0.1 |
| BaO | 0.0 | 0.0 | 0.0 | 0.0 | 0.0 | 0.0 |
| SrO | 0.0 | 0.0 | 0.0 | 0.0 | 0.0 | 0.0 |
| $TiO_2$ | 0.1 | 0.1 | 0.1 | 0.1 | 0.1 | 0.1 |
| $ZrO_2$ | 0.7 | 0.7 | 0.7 | 0.7 | 0.7 | 0.7 |
| $Y_2O_3$ | 1.3 | 1.3 | 1.3 | 1.3 | 1.3 | 1.3 |
| $Li_2O$ | 11.8 | 10.1 | 10.8 | 10.8 | 10.8 | 10.8 |
| $Na_2O$ | 4.8 | 4.8 | 5.1 | 4.5 | 4.8 | 4.8 |
| $K_2O$ | 1.2 | 1.2 | 1.2 | 1.2 | 1.4 | 1.0 |
| ZnO | 0.0 | 0.0 | 0.0 | 0.0 | 0.0 | 0.0 |
| $SiO_2 + Al_2O_3$ | 79.9 | 81.6 | 80.6 | 81.2 | 80.7 | 81.1 |
| $R_2O$ | 17.8 | 16.1 | 17.1 | 16.5 | 17 | 16.6 |
| $ZrO_2/(ZrO_2 + Y_2O_3)$ | 0.35 | 0.35 | 0.35 | 0.35 | 0.35 | 0.35 |
| MgO + CaO | 0.2 | 0.2 | 0.2 | 0.2 | 0.2 | 0.2 |
| $-25ZrO_2 + 100Y_2O_3$ | 113 | 113 | 113 | 113 | 113 | 113 |
| $100ZrO_2 + 63Y_2O_3$ | 152 | 152 | 152 | 152 | 152 | 152 |
| βOH (/mm) | 0.297 | 0.276 | 0.273 | 0.267 | 0.294 | 0.279 |
| Devitrification temperature (° C.) | 1170 | 1230 | 1290 | 1210 | 1190 | 1210 |
| Tcs (° C.) | 792 | 835 | 815 | 827 | 829 | 827 |
| Tx [° C.] | 798 | 841 | 820 | 832 | 834 | 832 |
| Tc (° C.) | 813 | 854 | 834 | 847 | 849 | 848 |
| Tg (DSC) (° C.) | 578 | 606 | 592 | 603 | 588 | 601 |
| Tcs − Tg (DSC) | 215 | 229 | 222 | 224 | 241 | 226 |
| Tcs/Tg (DSC) | 1.37 | 1.38 | 1.38 | 1.37 | 1.41 | 1.38 |
| Na_CS | 446 | 356 | 367 | 379 | 369 | 383 |
| Na_DOL | 96 | 101 | 99 | 99 | 92 | 100 |
| K_CS | 1165 | 1187 | 1189 | 1167 | 1165 | 1206 |
| K_DOL | 3.8 | 5.6 | 4.4 | 4.4 | 4.5 | 4.3 |
| Na/K DOL ratio | 25.3 | 18.0 | 22.5 | 22.5 | 20.4 | 23.3 |
| Crystal growth rate (μm/hr) of β-quartz solid | 568 | 359 | 363 | 502 | 347 | 512 |

TABLE 1-continued

| | | | | | | |
|---|---|---|---|---|---|---|
| solution at 1000° C. | | | | | | |
| Crystal growth rate (μm/hr) of β-spodumene at 1000° C. | 1028 | 828 | 793 | 1106 | 800 | 1079 |
| lnW | 15.7 | 12.4 | 13.6 | 12.4 | 15.2 | 12.4 |
| K1c (MPa · $m^{1/2}$) | 0.809 | 0.814 | 0.809 | 0.815 | 0.809 | 0.815 |

TABLE 2

| (mol %) | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|---|---|
| $SiO_2$ | 68.1 | 68.1 | 68.9 | 68.9 | 68.7 | 68.1 | 68.7 | 66.7 | 60.0 | 67.6 | 67.1 | 68.0 |
| $Al_2O_3$ | 12.0 | 12.0 | 12.4 | 12.0 | 12.0 | 12.0 | 12.0 | 14.0 | 15.0 | 12.0 | 11.6 | 10.2 |
| MgO | 3.5 | 3.5 | 0.1 | 0.1 | 0.1 | 3.5 | 0.1 | 0.0 | 7.0 | 3.5 | 3.3 | 3.5 |
| CaO | 0.2 | 0.2 | 0.1 | 0.1 | 0.1 | 0.2 | 0.1 | 0.2 | 0.1 | 0.2 | 0.2 | 0.2 |
| BaO | 0.0 | 0.0 | 0.0 | 0.0 | 0.0 | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 | 0.0 | 0.0 | 0.0 | 0.0 | 0.0 |
| $TiO_2$ | 0.1 | 0.1 | 0.1 | 0.1 | 0.1 | 0.1 | 0.1 | 0.0 | 0.1 | 0.1 | 0.1 | 0.1 |
| $ZrO_2$ | 0.6 | 0.6 | 0.3 | 0.5 | 0.7 | 0.6 | 0.9 | 2.0 | 0.2 | 0.6 | 1.1 | 1.2 |
| $Y_2O_3$ | 1.4 | 1.4 | 1.3 | 1.5 | 1.5 | 1.4 | 1.3 | 2.0 | 1.8 | 1.4 | 1.0 | 0.6 |
| $Li_2O$ | 10.4 | 10.4 | 10.8 | 10.8 | 10.8 | 10.7 | 10.8 | 11.0 | 10.8 | 10.7 | 10.0 | 12.0 |
| $Na_2O$ | 2.4 | 1.9 | 4.8 | 4.8 | 4.8 | 1.6 | 4.8 | 4.0 | 3.0 | 2.1 | 3.6 | 2.1 |
| $K_2O$ | 1.3 | 1.8 | 1.2 | 1.2 | 1.2 | 1.8 | 1.2 | 0.0 | 2.0 | 1.8 | 2.0 | 2.1 |
| ZnO | 0.0 | 0.0 | 0.0 | 0.0 | 0.0 | 0.0 | 0.0 | 0.0 | 0.0 | 0.0 | 0.0 | 0.0 |
| $SiO_2 + Al_2O_3$ | 80.1 | 80.1 | 81.3 | 80.9 | 80.7 | 80.1 | 80.7 | 80.7 | 75.0 | 79.6 | 78.7 | 78.2 |
| $R_2O$ | 14.1 | 14.1 | 16.8 | 16.8 | 16.8 | 14.1 | 16.8 | 15 | 15.8 | 14.6 | 15.6 | 16.2 |
| $ZrO_2/(ZrO_2 + Y_2O_3)$ | 0.30 | 0.30 | 0.19 | 0.25 | 0.32 | 0.30 | 0.41 | 0.50 | 0.10 | 0.30 | 0.52 | 0.67 |
| MgO + CaO | 3.7 | 3.7 | 0.2 | 0.2 | 0.2 | 3.7 | 0.2 | 0.2 | 7.1 | 3.7 | 3.5 | 3.7 |
| $-25ZrO_2 + 100Y_2O_3$ | 125 | 125 | 123 | 138 | 133 | 125 | 108 | 150 | 175 | 125 | 73 | 30 |
| $100ZrO_2 + 63Y_2O_3$ | 148 | 148 | 112 | 145 | 165 | 148 | 172 | 326 | 133 | 148 | 173 | 158 |
| βOH (/mm) | | | | | 0.277 | | 0.300 | | | | | |
| Devitrification temperature (° C.) | 1240 | 1240 | 1220 | 1240 | 1230 | 1250 | 1200 | | 1160 | 1225 | 1225 | 1225 |
| Tcs (° C.) | 796 | | 779 | 816 | 820 | 807 | 825 | | 770 | 802 | 808 | 777 |
| Tx [° C.] | 809 | | 795 | 821 | 825 | 808 | 831 | | 771 | 801 | 805 | 774 |
| Tc (° C.) | 825 | | 815 | 835 | 839 | 824 | 844 | | 794 | | | |
| Tg (DSC) (° C.) | 623 | | 590 | 595 | 600 | 622 | 604 | | 613 | 616 | 599 | 568 |
| Tcs − Tg (DSC) | 186 | | 189 | 221 | 220 | 185 | 222 | | 157 | 186 | 209 | 209 |
| Tcs/Tg (DSC) | 1.28 | | 1.32 | 1.37 | 1.37 | 1.30 | 1.37 | | 1.26 | 1.30 | 1.35 | 1.37 |
| Na_CS | | | 378 | | 386 | | 385 | | 534 | | | |
| Na_DOL | | | 101 | | 96 | | 96 | | 53 | | | |
| K_CS | | | 1160 | | 1190 | | 1188 | | 1498 | | | |
| K_DOL | | | 4.4 | | 4.4 | | 4.4 | | 1.9 | | | |
| Na/K DOL ratio | | | 23.0 | | 21.8 | | 21.8 | | 24.7 | | | |
| Crystal growth rate (μm/hr) of β-quartz solid solution at 1000° C. | 3081 | 1788 | 471 | | 438 | 2216 | 356 | 2849 | 4250 | 2163 | 523 | 571 |
| Crystal growth rate (μm/hr) of β-spodumene at 1000° C. | No | No | 992 | | 875 | No | 861 | | | | | |
| lnW | 15.9 | 16.6 | 15.2 | 15.2 | 15.2 | 16.6 | 15.2 | 7.2 | 22.4 | 18.8 | 20.0 | 16.2 |
| K1c (MPa · $m^{1/2}$) | 0.837 | 0.835 | 0.808 | 0.807 | 0.810 | — | 0.838 | 0.830 | — | — | — | — |

As shown in Tables 1 and 2, the glasses in Example 1, Examples 3 to 13, Example 18 and Example 20, which are Inventive Examples, tend to have a lower devitrification temperature, a smaller crystal growth rate, and a higher crystallization starting temperature, than Example 16 and Example 17, which are Comparative Examples, and exhibit excellent production properties. In addition, in the glasses in Examples 14, 15, and 19, which are Inventive Examples, crystal precipitation of β-spodumene is prevented, and glasses having a relatively smaller crystal growth rate can be obtained. In addition, it can be seen that the glasses in Inventive Examples exhibit the same strength as the Comparative Examples and have excellent chemical strengthening properties even when treated with a molten salt made of sodium nitrate or potassium nitrate. Further, the glasses in Example 1, Example 3 to Example 15, Example 18 to Example 19, and Example 20, which are Inventive Examples, tend to have a higher fracture toughness value K1c than Example 2, which is Comparative Example, and exhibit excellent properties of impact resistance.

As shown in Tables 1 and 2, the glasses in Example 1, Examples 3 to 13, Example 18, and Example 20, which are Inventive Examples, have a Na_DOL value larger than that in Example 22, which is Comparative Example with lnW of more than 20. Therefore, in the glasses in Example 1, Examples 3 to 13, Example 18, and Example 20, which are Inventive Examples, the ion exchange is performed deeper into the glass and the chemical strengthening properties are more excellent than Example 22, which is Comparative Example. In addition, as shown in Table 1, the glasses in Example 1, Example 3 to Example 13, Example 15, Example 18 to Example 20, Example 23, Example 24 and Example 25, which are Inventive Examples, have a crystal growth rate at 1000° C. of the β-quartz solid solution smaller than that in Example 21, which is Comparative Example with lnW of less than 10, and in the case where the glass is molded by the float method, it is possible to prevent the occurrence of defects due to crystallization in the float bath. Further, as shown in Table 1, the glasses in Example 1, Example 14, Example 15, and Example 20, which are Inventive Examples, have a fracture toughness value K1c larger than that in Example 21, which is Comparative Example with lnW of less than 10, and are excellent in impact resistance.

Although the present invention has been described in detail with reference to specific aspects, it is apparent to those skilled in the art that various changes and modifications can be made without departing from the spirit and scope of the present invention. Note that, the present application is based on a Japanese patent application (No. 2022-015032) filed on Feb. 2, 2022 and a Japanese patent application (No. 2022-179855) filed on Nov. 9, 2022, contents of which are incorporated by reference herein. In addition, all references cited here are entirely incorporated.

The invention claimed is:

1. A chemically strengthened glass comprising a compressive stress layer on a surface layer thereof, wherein a base glass composition of the chemically strengthened glass comprises, in terms of molar percentage based on oxides:

55% to 75% of $SiO_2$;
8% to 20% of $Al_2O_3$;
3% to 15% of $Li_2O$;
1% to 5% of $Na_2O$;
0% to 3% of $K_2O$;
0% to 10% of MgO;
0% to 3% of $Y_2O_3$;
0% to 3% of $ZrO_2$;
0% to 10% of CaO;
0% to 5% of SrO;
0% to 5% of ZnO;
0% to 3% of $TiO_2$;
0% to 1% of $SnO_2$;
0% to 5% of $P_2O_5$; and
0% to 10% of $B_2O_3$, a ratio $[ZrO_2]/([Y_2O_3]+[ZrO_2])$ of a content of $ZrO_2$ to a total content of $[Y_2O_3]$ and $[ZrO_2]$ is 0 or more and 0.7 or less, and the total content of $Y_2O_3$ and $ZrO_2$ is 0.0% or more and 3.0% or less, and a value of lnW represented by the following Formula (1) is 10 or more and 20 or less, $$\ln W=\ln(([Li_2O]+[Na_2O]+[K_2O]+[MgO]+[CaO]+[SrO]+[BaO]+[ZnO])!/([Li_2O]!\times[Na_2O]!\times[K_2O]!\times[MgO]!\times[CaO]!\times[SrO]!\times[BaO]!\times[ZnO]!)) \quad \text{Formula (1)}$$

provided that, in the Formula (1), $[Li_2O]$, $[Na_2O]$, $[K_2O]$, [MgO], [CaO], [SrO], [BaO], and [ZnO] respectively represent contents of components of $Li_2O$, $Na_2O$, $K_2O$, MgO, CaO, SrO, BaO, and ZnO in terms of molar percentage based on oxides.

2. The chemically strengthened glass according to claim 1, wherein a ratio $[K_2O]/[Na_2O]$ of a content of $K_2O$ to a content of $Na_2O$ is 0 or more and 1.8 or less.

3. The chemically strengthened glass according to claim 1, wherein a value represented by $[Al_2O_3]-[Na_2O]-[K_2O]+[Li_2O]$ is 15.0% or more and 26.0% or less.

4. The chemically strengthened glass according to claim 1, wherein a value represented by $-25\times[ZrO_2]+100\times[Y_2O_3]$ is 135 or less.

5. The chemically strengthened glass according to claim 1, wherein a value represented by $100\times[ZrO_2]+63\times[Y_2O_3]$ is 180 or less.

6. The chemically strengthened glass according to claim 1, wherein a total alkali represented by $R_2O(Li_2O+Na_2O+K_2O)$ is 13.0% or more and 18.0% or less.

7. The chemically strengthened glass according to claim 1, wherein Na_DOL/K_DOL, which is a ratio of Na_DOL to K_DOL defined below, is 26 or less, K_DOL: a compressive stress layer depth of a chemically strengthened glass obtained by subjecting the glass to ion exchange using a molten salt made of 100% potassium nitrate, Na_DOL: a compressive stress layer depth of a chemically strengthened glass obtained by subjecting the glass to ion exchange using a molten salt made of 100% sodium nitrate, provided that a time and a temperature of the ion exchange in calculating the K_DOL and the Na_DOL are same conditions.

* * * * *